US012667858B2

(12) United States Patent
Aitken et al.

(10) Patent No.: US 12,667,858 B2
(45) Date of Patent: Jun. 30, 2026

(54) SPRAY DISPENSER

(71) Applicant: Conopco, Inc., Englewood Cliffs, NJ (US)

(72) Inventors: Andrew Robert Aitken, Hamilton (CA); Sebastian Alvarez, Follifoot (GB); Sjoerd Paul Hoijinck, Tilburg (NL); Eduardo Carvalhal Lage Von Buettner Ristow, London (GB); Guy Richard Thompson, Parkgate (GB)

(73) Assignee: CONOPCO, INC., Hoboken, NJ (US)

( * ) Notice: Subject to any disclaimer, the term of this patent is extended or adjusted under 35 U.S.C. 154(b) by 462 days.

(21) Appl. No.: 18/256,892

(22) PCT Filed: Dec. 7, 2021

(86) PCT No.: PCT/EP2021/084513

§ 371 (c)(1),
(2) Date: Jun. 9, 2023

(87) PCT Pub. No.: WO2022/128607

PCT Pub. Date: Jun. 23, 2022

(65) Prior Publication Data

US 2024/0091800 A1 Mar. 21, 2024

(30) Foreign Application Priority Data

Dec. 15, 2020 (EP) .................................... 20214206

(51) Int. Cl.
*B05B 7/24* (2006.01)
*B05B 7/04* (2006.01)

(52) U.S. Cl.
CPC .......... *B05B 7/2418* (2013.01); *B05B 7/0433* (2013.01); *B05B 7/2437* (2013.01); *B05B 7/2464* (2013.01)

(58) Field of Classification Search
CPC ... B05B 7/2418; B05B 7/0433; B05B 7/2437; B05B 7/2464; B05C 17/015; A61L 2/22
(Continued)

(56) References Cited

U.S. PATENT DOCUMENTS 1,868,518 A 7/1932 Breuer
3,746,261 A 7/1973 Nozawa et al.
(Continued)

FOREIGN PATENT DOCUMENTS

CN 106829184 6/2017
EP 0705644 4/1996
(Continued)

OTHER PUBLICATIONS

Search Report and Written Opinion in EP20214206; Jun. 14, 2021; European Patent Office (EPO).
(Continued)

*Primary Examiner* — Kevin Edward Schwartz
(74) *Attorney, Agent, or Firm* — Stephanie Huang

(57) ABSTRACT

A hand held spray dispenser in which air and liquid are pressurised towards a mixing chamber by energy generated by a manual activation element that is rotated with a unidirectional twist to energise one or more energy storage bodies, energy from which is released to generate sufficient air pressure and air flow and sufficient liquid flow for a spray to be formed from the air-liquid mixture.

8 Claims, 18 Drawing Sheets

(58) Field of Classification Search
USPC ........................... 239/318; 137/893; 222/630
See application file for complete search history.

(56) References Cited

U.S. PATENT DOCUMENTS

| | | | |
|---|---|---|---|
| 3,790,034 | A | 2/1974 | Horvath |
| 3,797,748 | A | 3/1974 | Nozawa et al. |
| 3,799,448 | A | 3/1974 | Nozawa et al. |
| 4,147,280 | A | 4/1979 | Spatz |
| 4,155,485 | A | 5/1979 | Spatz |
| 4,167,941 | A | 9/1979 | Capra et al. |
| 4,174,052 | A | 11/1979 | Capra et al. |
| 4,220,264 | A | 9/1980 | Gamadia |
| 5,323,935 | A | 6/1994 | Gosselin et al. |
| 5,348,189 | A | 9/1994 | Cater |
| 5,405,060 | A | 4/1995 | von Schuckmann |
| 5,480,069 | A * | 1/1996 | Barney ................. B05B 7/2427 222/401 |
| 5,816,504 | A | 10/1998 | Zuckschwerdt et al. |
| 6,170,716 | B1 | 1/2001 | Chen |
| 8,177,101 | B1 | 5/2012 | Blake |
| 8,286,837 | B1 | 10/2012 | Blake |
| 2004/0238572 | A1* | 12/2004 | Blake .................... B05B 9/0883 222/321.5 |
| 2008/0265060 | A1 | 10/2008 | Canfield et al. |
| 2010/0193547 | A1* | 8/2010 | Laidler ................... B29C 49/06 222/207 |
| 2014/0312144 | A1 | 10/2014 | Hui et al. |
| 2015/0328652 | A1 | 11/2015 | Yamada et al. |

FOREIGN PATENT DOCUMENTS

| | | |
|---|---|---|
| EP | 0462281 | 8/1996 |
| EP | 0904842 | 3/1999 |
| FR | 2668721 | 5/1992 |
| JP | 2004106885 | 4/2004 |
| JP | 2015227197 | 12/2015 |
| WO | WO9316809 | 9/1993 |
| WO | WO03095097 | 11/2003 |
| WO | WO2005016550 | 2/2005 |
| WO | WO2009116858 | 9/2009 |

OTHER PUBLICATIONS

Search Report and Written Opinion in PCTEP2021084509; Mar. 24, 2022; World Intellectual Property Org. (WIPO).
Search Report and Written Opinion in PCTEP2021084513; Mar. 24, 2022; World Intellectual Property Org. (WIPO).
IPRP2 in PCTEP2021084509; Apr. 26, 2023; World Intellectual Property Org. (WIPO).
Written Opinion of the IPEA in PCTEP2021084509; Oct. 27, 2022; World Intellectual Property Org. (WIPO).
Search Report and Written Opinion in EP20214165; Jun. 14, 2021; European Patent Office (EPO).
Written Opinion of the IPEA in PCTEP2021084513; Oct. 27, 2022; World Intellectual Property Org. (WIPO).
IPRP2 in PCTEP2021084513; Mar. 27, 2023; World Intellectual Property Org. (WIPO).

* cited by examiner

SPRAY DISPENSER

RELATED APPLICATIONS

The present application is a national phase filing under 35 USC 371 of International Application No. PCT/EP2021/084513, filed on Dec. 7, 2021, which claims priority from European Patent Application No. 20214206.3, filed on Dec. 15, 2020, the contents of which are incorporated herein in their entirety for all purposes.

FIELD OF INVENTION

The present invention is in the field of Spray dispensers, in particular spray dispensers that do not require the presence of liquified propellant gas in the formulation to be sprayed.

BACKGROUND

There is a desire to minimise the quantity of hydrocarbons and other aerosol propellants emitted into the atmosphere in order to reduce global warming. Also, there is a desire to avoid the emission of gases that may harm the ozone layer, such as certain chlorofluorocarbons. These desires have led to research into spray dispensers that can operate effectively without the need for a liquified propellant gas, whether hydrocarbon or other, in the formulation to be sprayed. Typically, nitrogen is used to affect spray production in such dispensers.

U.S. Pat. No. 5,323,935 (Procter & Gamble, 1994) discloses a dispenser for spraying consumer products comprising a bubble injection means for forming bubbles in a liquid to be sprayed that are bigger than the diameter of the exit orifice of the dispenser.

WO2005/016550 A1 (Unilever, 2005) discloses a domestic spray dispenser with a means for injecting bubbles of gas into a film of liquid and a continuous feed gas pump.

EP 462,281 B1 (Yoshino Kogyosho Co., 1996) discloses a liquid jet blower which avoids the problem of undesirable droplet generation under low pressure conditions in systems where pressurised air is used to produce a liquid jet.

The means by which energy is provided for the generation of sprays from domestic spray dispensers is a key feature of at least certain embodiments of the present invention. It is preferred that this is done in a renewable fashion and it is particular preferred that the energy can be provided by the user of the dispenser.

JP2015227197A (Yoshino Kogyosho Co., 2015) discloses a foam discharger comprising a conversion mechanism for converting a rotational action into an ascending action on a plunger used pressurise the composition to be dispensed.

U.S. Pat. No. 5,405,060 A (Von Schuckmann, 1995) discloses a liquid spray dispenser having an air pump which can be actuated by means of a handle, by a backward and forward movement.

GENERAL DESCRIPTION

It is an object of the present invention to enable the production of a high quality spray without the need for a liquified propellant gas in the formulation to be sprayed.

It is a further object of the present invention to provide a hand-held spray dispenser operating through manual pressurisation of air and liquid, the mixing of which produces a high quality spray.

It is a further object of the present invention to provide a hand-held spray dispenser that has good ergonomics.

It is a further object of the present invention to provide a hand-held spray dispenser that produces an aerosol, as opposed to a foam, particularly with regard to any of the other aspects of the invention.

In a first aspect of the invention, there is provided a hand held spray dispenser comprising a liquid chamber, an air chamber, and a mixing chamber, whereby flow of the liquid in the liquid chamber and flow of the air in the air chamber towards the mixing chamber is prevented by one or more valves; when the valve or valves are released, liquid is forced under pressure from the liquid chamber to the mixing chamber via a liquid conduit and air is forced under pressure from the air chamber to the mixing chamber via an air conduit, the air-liquid mixture in the mixing chamber being forced through an exit orifice as a spray, characterised in that a manual activation element is rotated with a unidirectional twist to energise one or more energy storage bodies, energy from which is released to generate sufficient air pressure and air flow and sufficient liquid flow for a spray to be formed from the air-liquid mixture as it leaves the exit orifice.

In a second aspect of the invention, there is provided a method of topical application of a cosmetic composition comprising the use of a spray dispenser according to the first aspect of the invention. This equates to the use of a spray dispenser according to the first aspect of the invention for the topical application of a cosmetic composition. In this second aspect of the invention, particular benefits arise when the composition is applied to the underarm areas of the human body, due to the ergonomics of the design.

In a third aspect of the invention, there is provided a method of re-loading a spray dispenser according to the first aspect of the invention, wherein the liquid chamber is entirely contained within a refill unit that can be reversibly attached to the other elements of the dispenser.

The good ergonomics of the present invention relate to its ease of use, in particular the ease with which the spray dispenser can be primed for use, particularly in certain preferred embodiments (vide infra). A further ergonomic advantage of preferred embodiments of the invention relates to the ease with which the dispenser can incorporate a refill unit.

Spray dispensers of the invention are typically hand operated. In preferred embodiments, they may be used to spray household care formulations, personal care formulations or medicinal formulations. Spray dispensers of the invention are preferably used with household care or personal care formulations and more preferably with personal care formulations, particularly those applied to the surface of the human body because of the good sensory properties of the sprays typically generated.

Herein, medicinal spray dispensers include inhalers, dispensers for topical treatment of skin disorders, for topical sanitization, for topical wound dressing and for topical treatment of systemic conditions, this list being non-exhaustive, but each option listed being a specific possible application of the present invention.

Herein, household care formulations include hard surface cleaners, room fresheners, laundry products and plant care products, this list being non-exhaustive, but each option listed being a specific possible application of the present invention.

Herein, personal care formulations include deodorants and antiperspirants, perfumes, hair care formulations, oral care formulations, and skin care formulations including sunscreens and make-up formulations, this list being non-exhaustive, but each option listed being a specific possible application of the present invention.

Herein, orientation terms such as “horizontal/vertical”, “top/bottom” and “upper/lower” refer to the dispenser and/or components thereof when the dispenser is oriented in an upright manner, with the mixing chamber and exit orifice located towards the top, unless defined otherwise.

Herein, the “front” of the dispenser is where the exit orifice for the spray as generated by the dispenser is located.

Herein, “upper and lower middle parts” of the dispenser refer to axial sections of the dispenser that do not extent as far as its top or bottom, but which extent from approximately the axial middle of the dispenser upwards and from approximately the axial middle of the dispenser downwards, respectively Herein, “clockwise” and “anticlockwise” directions refer to the dispenser when viewed from above.

Herein, any feature of a particular aspect or embodiment of the present invention may be utilized in any other aspect of the invention. Any feature described as ‘preferred’ should be understood to be particularly preferred in combination with a further preferred feature or features. Any feature stated as preferred in a particular aspect or embodiment of the invention should be understood to be a preferred feature in the other aspects or embodiments of the invention.

Herein, the word ‘comprising’ is intended to mean ‘including’ but not necessarily ‘consisting of’ or ‘composed of’, i.e. it is used non-exhaustively.

Numerical ranges expressed in the format ‘x to y’ are understood to include x and y, unless specified otherwise.

Detailed Description

Typical spray dispensers according to the invention are cylindrical in form. In most embodiments, the mixing chamber and exit orifice are located towards the top of the dispenser. The rotatable manual activation element may preferably be located centrally and/or towards the bottom of the dispenser.

In some preferred embodiments of the invention, the top-to-bottom order of the components is the mixing chamber and exit orifice above the air chamber; the air chamber above the manual activation element and energy storage body; and the manual activation element and energy storage body above the liquid chamber.

In preferred embodiments as described in paragraph immediately above, the air chamber is preferably located in an upper middle part of the dispenser; the manual actuation element and one or more energy storage bodies are located in a lower middle part of the dispenser; and the liquid chamber is located in a bottom part of the dispenser.

In some other preferred embodiments of the invention, the top-to-bottom order of the components is the mixing chamber and exit orifice above the liquid chamber; the liquid chamber above the manual activation element and energy storage body; and manual activation element and energy storage body above the air chamber.

In embodiments as described in paragraph immediately above, the mixing chamber and exit orifice are located in a top part of the dispenser; the liquid chamber is located in an upper middle part of the dispenser; the manual actuation element and one or more energy storage bodies are located in a lower middle part of the dispenser; and the air chamber is located in a bottom part of the dispenser.

In each embodiment of the invention, the exit orifice is preferably located adjacent to a cylindrical side wall of the dispenser.

In preferred embodiments, the air is released from air chamber simultaneous with the liquid being released from the liquid chamber. In certain particularly preferred embodiments, the period for the release of air from the air chamber extends beyond the period for release of the liquid from the liquid chamber, in order to clear the mixing chamber and exit orifice.

In preferred embodiments, the air chamber may take the form of inflatable bellows, expanding as air is drawn into them and contracting as air is forced out of them. In such embodiments, air is drawn into the bellows during an activation or priming step and air is forced from the bellows during actuation, i.e. spray generation. In some preferred embodiments of this type, the air forced from the bellows is also used to pressurise the liquid in the liquid chamber towards the mixing chamber.

The air chamber, whether in the form of bellows or otherwise, typically comprises an inlet valve, allowing air to enter whilst the air chamber is expanded.

In preferred embodiments, the air is released from the air chamber and pressurised towards the turbulence chamber at a flow rate of from 0.4 to 3.0 L/min. Such flow rates lead to enhancing spray quality.

In preferred embodiments, the air is pressurised to from 0.3 to 3 bar prior to being forced from the air chamber. In particularly preferred embodiments, the air is pressurised to from 0.3 to 3 bar in the air chamber and this results in a flow rate of from 0.4 to 3.0 L/min. towards the mixing chamber.

In some preferred embodiments of the invention, air from the air chamber is used to pressurise the liquid in the liquid chamber and thereby force it towards the mixing chamber. Such embodiments are preferably used with just one energy storage body, which is preferably a spring.

In preferred embodiments, the liquid is released from the liquid chamber and pressurised towards the mixing chamber at a flow rate of from 0.15 to 0.6 g/s. Such flow rates lead to enhancing spray quality, particularly when combined with the preferred air flow rate of from 0.4 to 3.0 L/min. as described above.

In embodiments in which air from the air chamber is not used to pressurise the liquid in the liquid chamber, a second energy storage body, preferably a spring, may be used to pressurise the liquid in the liquid chamber.

In preferred embodiments in which air from the air chamber is not used to pressurise the liquid, a single rotatable manual actuation element is used to store energy in two, more preferably one, energy storage bodies, energy from these bodies or body being used to pressurise the air in the air chamber and the liquid in the liquid chamber. In such embodiments, one or both of the energy storage bodies are preferably springs. Further details of such dispensers are given in the Specific Embodiments section.

In preferred embodiments, the liquid chamber is part of a refill unit. Such a refill unit may be fitted in the dispenser at the bottom, below the manual activation element, or it may be fitted into a central axial regional, typically above the manual activation element.

Refill units used in the present invention may be incorporated as filled refills sold with their contents, i.e. the liquid or composition to be sprayed.

In some embodiments, the refill unit, when emptied of the liquid in liquid chamber, may be removed and the liquid chamber refilled before being reinserted.

When employed, the refill unit typically has a sealed top which needs to be removed or punctured prior to use. With the seal removed, a dip tube from the dispenser may be inserted into the liquid chamber in the refill unit, in some embodiments. In other embodiments, the refill unit has an integral dip-tube which needs to be linked to the liquid conduit within the dispenser.

In preferred embodiments, the spray produced by the dispenser is a fine spray having a Sauter mean droplet size (D[3,2]) of less than 100 microns, preferably from 5 to 100 microns, more preferably from 5 to 70 microns, and most preferably from 10 to 60 microns.

The one or more valves controlling the flow of the liquid in the liquid chamber and the flow of the air in the air chamber towards the mixing chamber is/are a key element of spray dispensers according to the invention. The valve or valves prevent access of the liquid in the liquid chamber and the air in the air chamber to the mixing chamber, via their respective conduits, until a valve or valves sealing off flow from each to the mixing chamber is or are released. When the valve or valves are released, typically by a trigger, the air and liquid are allowed to pass to the mixing chamber.

In certain particularly preferred embodiments, a single seal, such as an O-ring, is employed to seal off access of both the liquid in the liquid chamber and the air in the air chamber to the mixing chamber, via their respective conduits.

When the valve or valves is/are opened, air from the air chamber is forced under pressure from the air chamber to the mixing chamber via an air conduit. In certain preferred embodiments, the pressurised air from the air chamber is also used to pressurise the liquid in the liquid chamber, forcing it from the liquid chamber to the mixing chamber via the liquid conduit. In other embodiments, the liquid may be pressured from the liquid chamber by a spring, also primed, i.e. energised, by the action of a manual activation element.

In embodiments employing more than one valve to open flow of air from the air chamber and flow of liquid towards the mixing chamber, it is preferable to have two valves, one controlling air flow and one controlling liquid flow. In such embodiments, it is preferred that the valves are designed to be opened simultaneously. It is particularly preferred that the air flow valve is designed to stay open longer than the liquid flow valve in order to clear residual liquid from the mixing chamber.

The manual activation element is a rotatable element that serves to energise one or more energy storage bodies within the dispenser. In some preferred embodiments, the manual actuation element is a collar around the dispenser in a plane orthogonal to the long axis of the spray dispenser. In such embodiments, the collar may be rotated independent of the other elements of the dispenser or it may be rotated together with an attached liquid chamber, typically present as part of a refill unit. In some embodiments, the collar is located around a lower middle part of the dispenser.

In some embodiments, notably those in which the air chamber is located at the bottom of the dispenser as described hereinabove, the manual activation element consists of the entire lower part of the dispenser, therein containing the air chamber and enclosing one or more energy storage bodies.

The unidirectional twist used to energise the one or more energy storage bodies is preferably capable of being done as a single unidirectional twist, although multiple twists in the same direction are also possible. In preferred embodiments, an additional twist may be given to the manual activation element part way through actuation of the dispenser in order to re-energise one or more of the energy storage bodies.

The unidirectional twist enables simple activation and good ergonomics of use.

In preferred embodiments, at least one of the energy storage bodies is a spring. In particularly preferred embodiments, each of the energy storage bodies present is a spring.

Springs used as energy storage bodies in the present invention are preferably compression springs.

Following actuation of the dispenser, it is preferred that the manual activation element does not need to be rotated back to its original position; it is preferred that the dispenser resets itself ready for further activation during actuation. I.e. it is preferred that the dispenser is "self-resetting" following actuation. This may be achieved by a suitable cam and cam follower arrangement within the dispenser (vide infra).

The preferred dispensers described in the paragraph immediately above have two phases of operation: "activation" when the dispenser is charged or primed and energy is stored in the energy storage body and "actuation" when energy is released from the energy storage body and the liquid and air are forced from their respective chambers and a spray is produced from them, as described further herein.

The fine spray that can often be generated by dispensers according to the invention is largely the result of the manner in which mixing of the air and liquid streams is achieved. In preferred embodiments, the air is introduced into the liquid adjacent to the inlet orifice of mixing chamber. In this way, the air is introduced into the liquid before it enters the mixing chamber, which leads to the production of a high quality, fine spray.

Herein, "adjacent to the inlet orifice" means "close to" the inlet orifice, but before entry thereinto.

The point where the air is introduced into the liquid may be considered to be the end of the air conduit.

The point where the air is introduced into the liquid is preferably within 5 mm of the inlet orifice of the mixing chamber and more preferably within 2 mm thereof.

In preferred embodiments, the distance from where the air is introduced into the liquid to the inlet orifice of the mixing chamber is less than the depth of the mixing chamber.

Herein, the depth of the mixing chamber is the distance within the chamber between the inner ends of the inlet orifice and the outlet orifice, measured in a linear axial manner relative to the mixing chamber, which has the outlet orifice at its "top" and the inlet orifice at its "bottom".

A preferred feature of the mixing chamber is that its inlet orifice and outlet orifice are radially offset, i.e. they are not radially aligned. This tends to increase turbulence in the mixing chamber and enhance spray quality.

A further preferred feature of the mixing chamber is that its inlet orifice is equal to or greater in diameter than its outlet orifice. This can again increase turbulence in the mixing chamber and enhance spray quality, particularly when combined with the feature described in the paragraph immediately above.

Herein, the diameters of the inlet and outlet orifices of the mixing chamber are the minimum cross-sectional distances across these channels.

Dispensers of the present invention are particularly suited for use with cosmetic compositions intended to for topical application, due to their ergonomics. Such compositions must be sprayable, being liquids at 25° C. and atmospheric pressure. Such compositions preferably comprise a cosmetically acceptable carrier fluid and an "active".

Cosmetically acceptable carrier fluids suitable for use with compositions used with the present invention include water and ethanol. The compositions may be solutions or emulsions.

Actives that may be incorporated in cosmetic compositions used with the present invention may advantageously be those typically applied to the underarm regions of the human body, in particular deodorant actives, including antiperspirant actives in particular.

SPECIFIC EMBODIMENTS AND FURTHER DETAILED DESCRIPTION

The invention will now be further described by reference to specific embodiments. The following figures illustrate these embodiments. The specific embodiments are intended to clarify the invention but not to limit the invention.

The descriptions given of particular elements of the spray dispenser (1), such as the refill unit (7, 107, 207, 307), may be used with each of the other features herein described to the extent this would be practicable.

Figure 1:
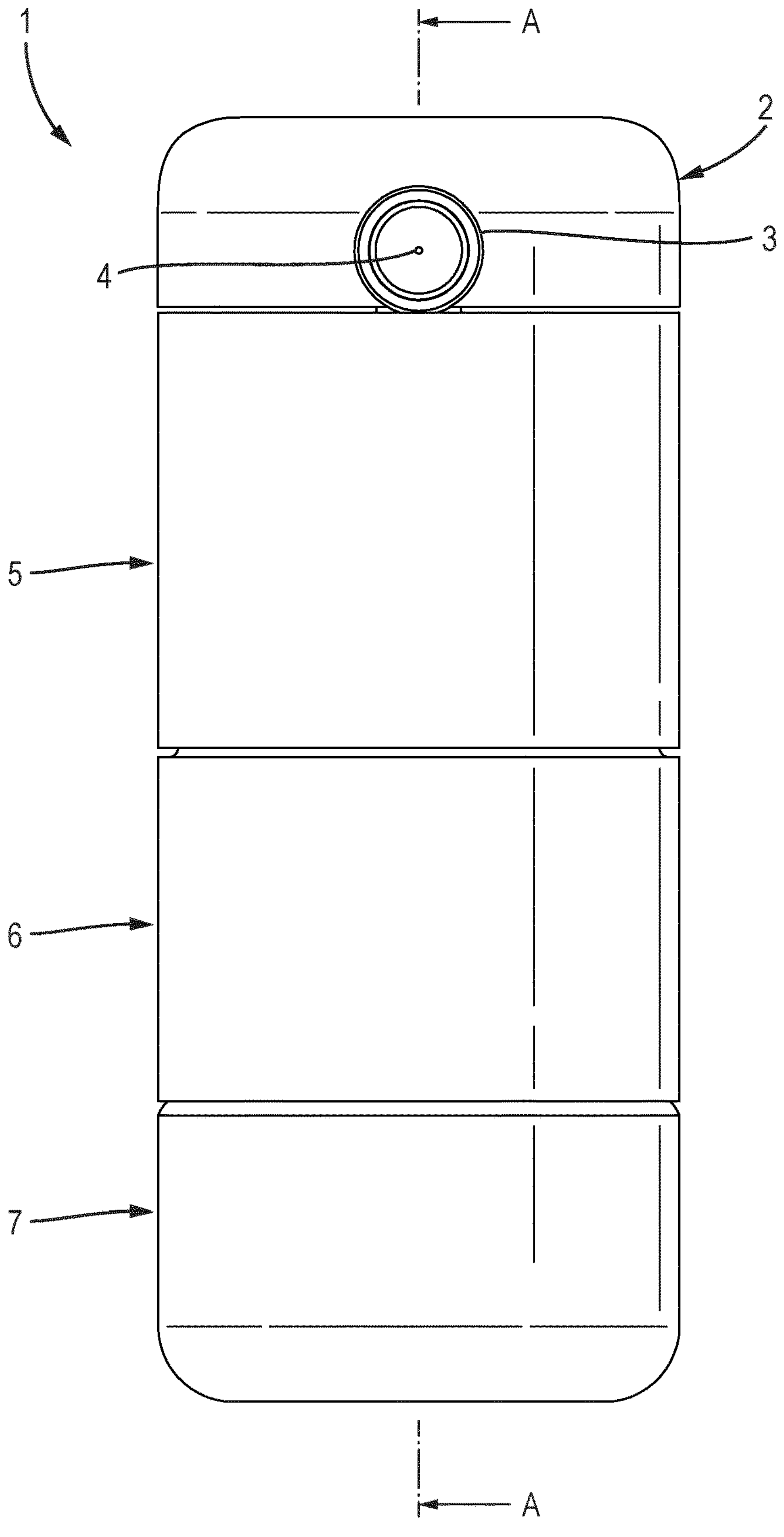
FIG. 1 is a front view of a first embodiment of a spray dispenser (1) according to the invention.

FIG. 1 illustrates the relative positioning of the features of a first embodiment of a spray dispenser (1) according to the invention, as seen from the front outside. The dispenser (1) comprises a spray through cap (2) at its top with an aperture (3) through which may be seen an exit orifice (4) through which the spray generated by the dispenser (1) emerges. Immediately below the spray through cap (2) is a cylindrical outer shell (5) and immediately below this is a rotatable collar (6). Immediately below the collar (6) there is a refill unit (7) for the dispenser (1). Further details of each of these features and other features are given below.

Figure 2:
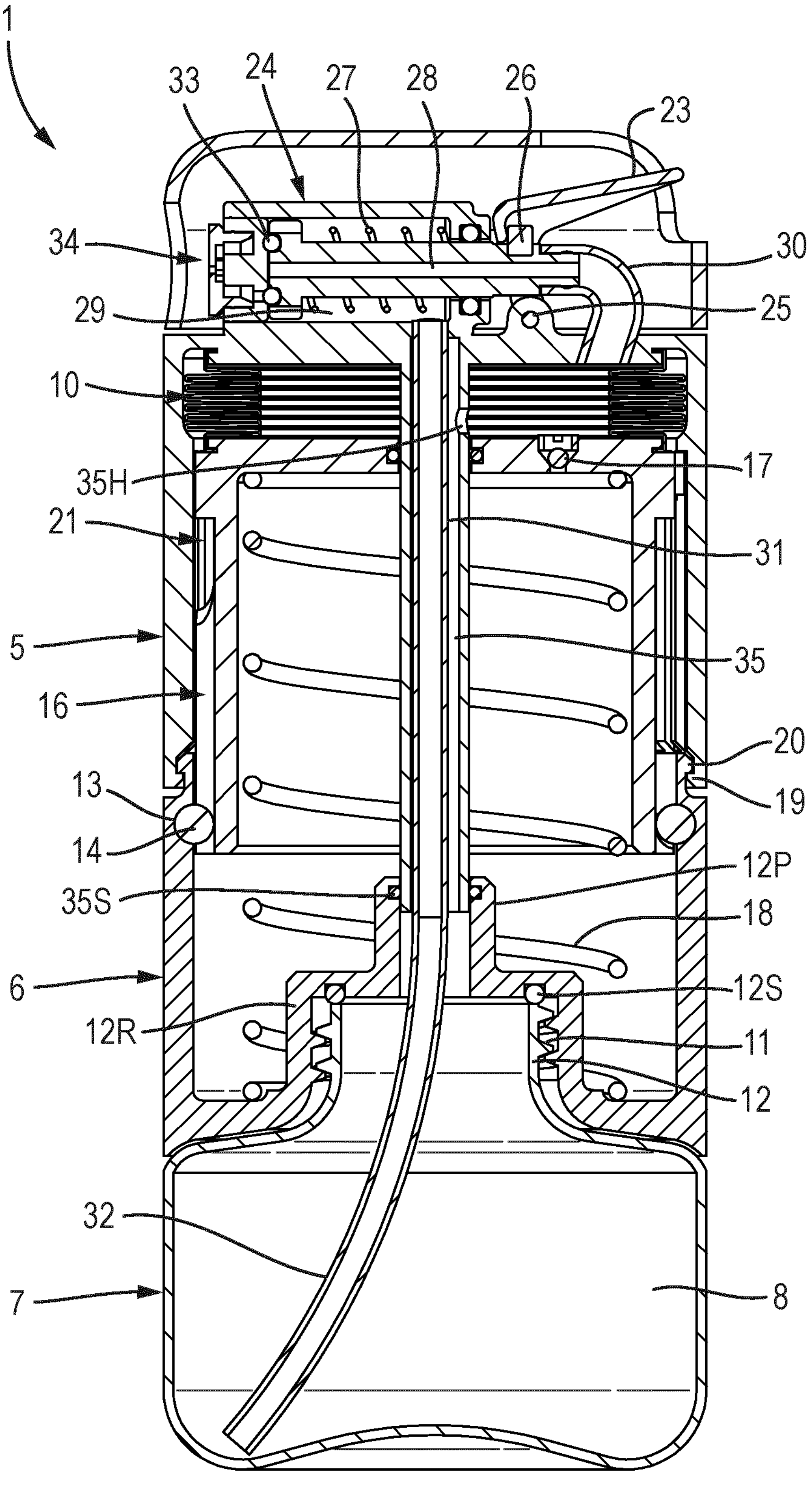
FIG. 2 is a cross-section through a spray dispenser (1) as illustrated in FIG. 1.
Figure 3:
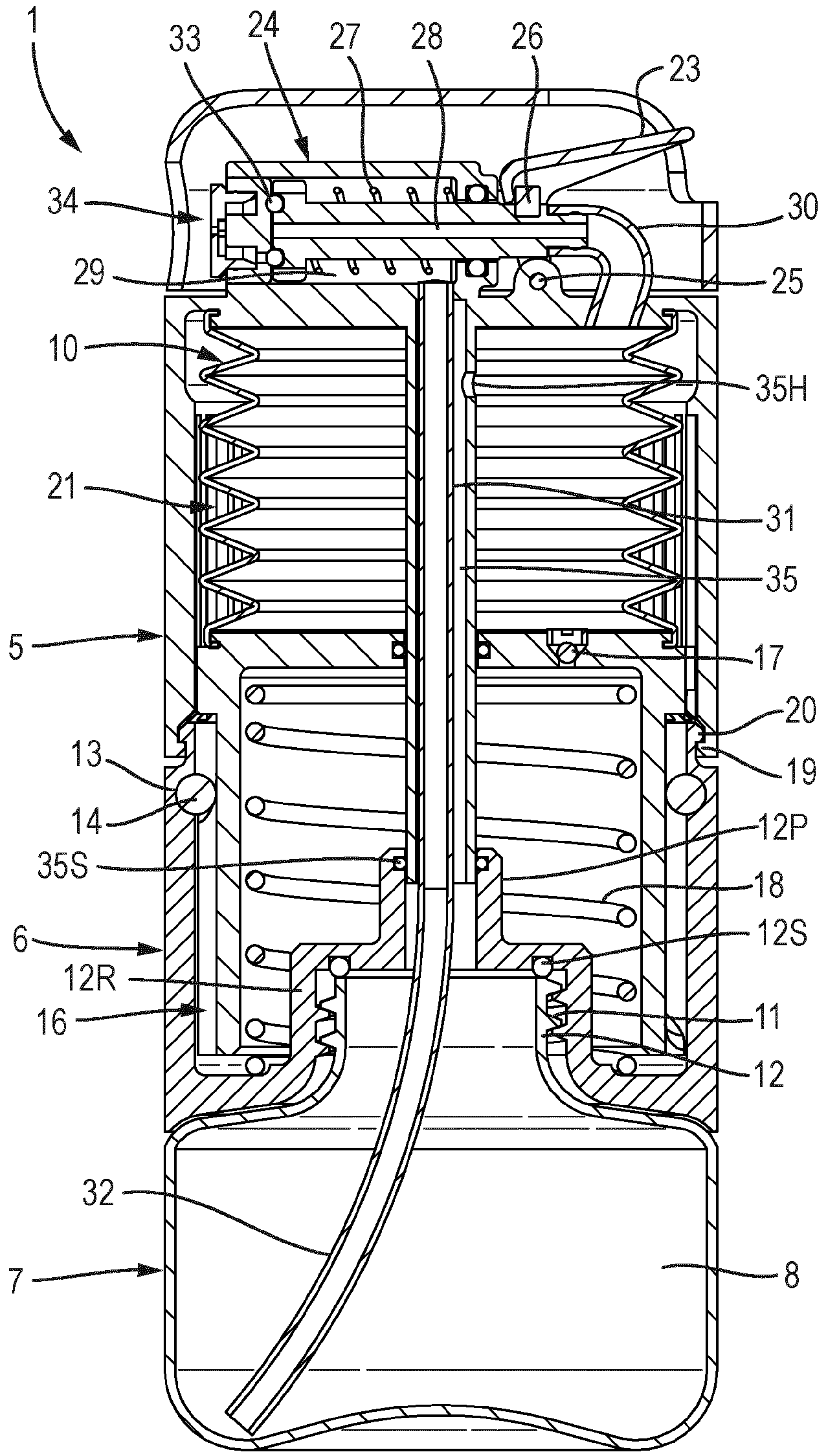
FIG. 3 is a cross-section through the spray dispenser (1) illustrated in FIG. 2, but in a "charged" aka "primed" state.

The spray dispenser (1) illustrated in FIGS. 1 to 4 comprises a liquid chamber (8), holding a liquid composition which is to be sprayed, and an air chamber (9), which takes the form of inflatable bellows (10), shown collapsed in FIG. 2 and inflated in FIG. 3. The liquid chamber (8) is the main part refill unit (7).

The bellows (10) are moved from collapsed to inflated by means of the rotatable collar (6) sat around the periphery of the spray dispenser (1) in a plane orthogonal to the long axis (A) of the spray dispenser (1) and located below the bellows (10). In this embodiment, the collar (6) is attached to a refill unit (7), comprising the liquid chamber (8), which also rotates when the collar (6) is rotated. The refill unit (7) is reversibly attached to the collar (6) by a screw thread (11) between a neck (12) of the refill unit (7) and an internal cylindrical receiver (12R) located within the collar (6). The neck (12) of the refill unit (7) is sealed against a top wall of the internal cylindrical receiver (12R) by an O-ring seal (12S).

The collar (6) has two hemispherical indents (13) cut into its internal surface which house two ball cam followers (14). The ball cam followers (14) are designed to follow two cam ramps (15) on the outer surface of an internal chassis (16) and move up said cam ramps (15) as the collar (6) is rotated anticlockwise. The ball cam followers (14) are held in a fixed position on the inner surface of the collar (6) by the indents (13) in which they sit; hence, the internal chassis (16) is forced downwards into the rotatable collar (6) as the collar (6) is rotated anticlockwise.

Figure 4:
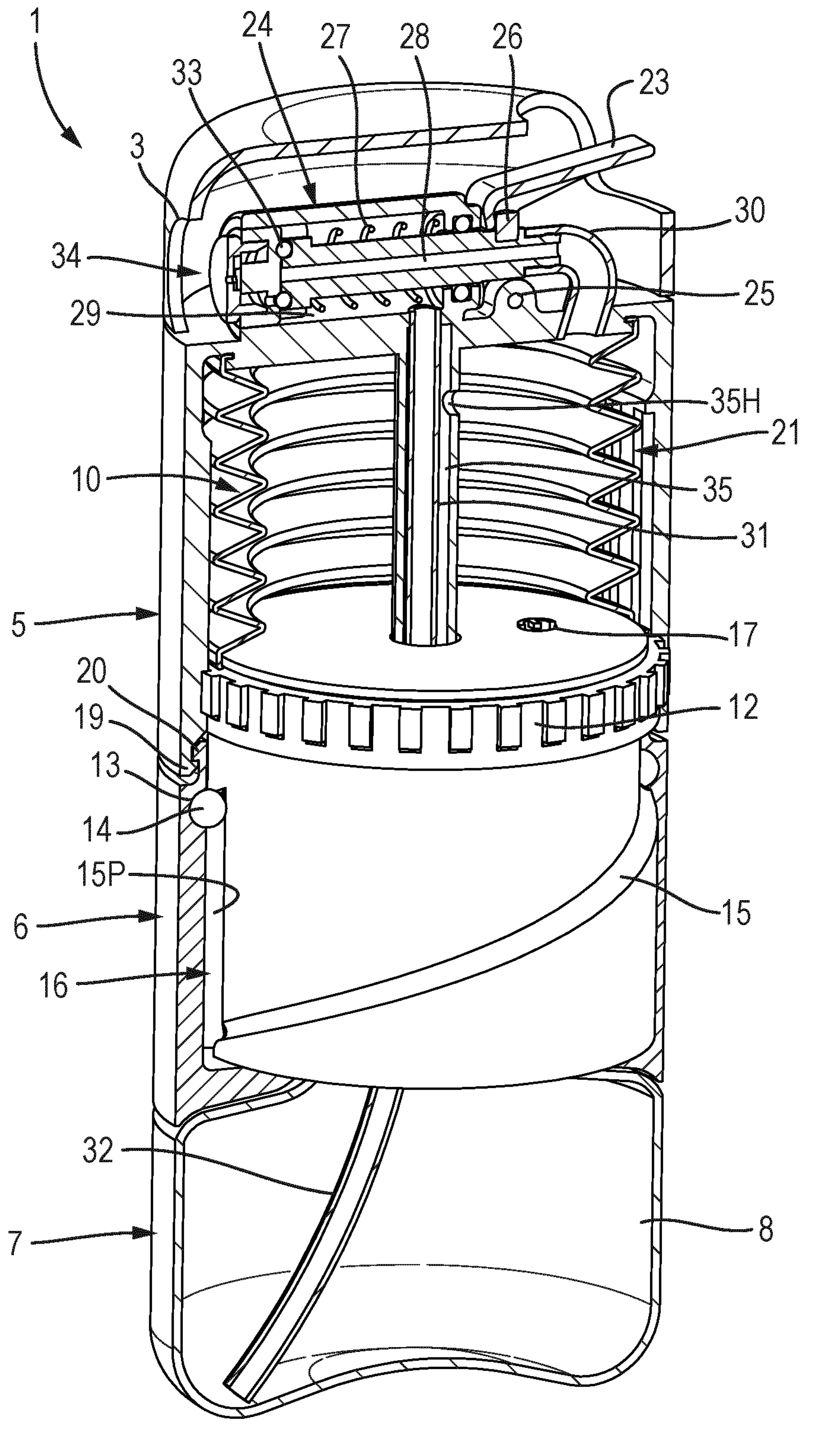
FIG. 4 is an isometric view of the spray dispenser (1) as illustrated in FIG. 3.

Attached to the top of the internal chassis (16) at their lower end are the bellows (10). As the internal chassis (16) is forced downwards, the bellows (10) are pulled open and air enters them through a check valve (17). When the ball cam followers (14) have reached the top of their cam ramps (15), the bellows (10) are fully expanded, as shown in FIGS. 3 and 4.

The internal chassis (16), which takes the form of an inverted cup, houses a main spring (18) for powering the spray mechanism. As the internal chassis (16) is forced downwards, the main spring (18) becomes compressed, reaching its maximum compression when the ball cam followers (14) have reached the top of their cam ramps (15) and the bellows (10) are fully expanded, as shown in FIGS. 3 and 4.

The bellows (10) are of circular cross-section and closely surrounding them is the cylindrical outer shell (5). When the bellows (10) are collapsed, the outer shell (5) also surrounds a substantial portion of the internal chassis (16). The cylindrical outer shell (5) is attached to the rotatable collar (6) by snap-fit connection elements (19, 20) that run around the lower circumference of the cylindrical outer shell (5) and the upper circumference of the rotatable collar (6), respectively, and which allows for rotation of the latter relative to the former.

Located around the internal surface of the outer shell (5) are multiple vertical splines (21) which project a short distance inwards towards the central axis (A) of the dispenser. These splines (21) interact with spline followers (22) which are radially recessed into an upper part of the internal chassis (16). Interaction between the splines (21) and the spline followers (22) prevent rotation of the internal chassis (16) relative to the outer shell (5).

Rotationally beyond the tops of the cam ramps (15), in an anticlockwise direction, the cam ramps (15) terminate at precipices (15P), one of which is shown in FIG. 2. When the ball cam followers (14) have reached this rotational position, the internal chassis (16) is forced upwards to an extent by the main spring (18), as the cam ramps (15) are no longer being held down the ball cam followers (14). As the internal chassis (16) moves upwards, the bellows (10) get compressed, but only until the air pressure in the bellows (10), which is maintained by the check valve (17), is sufficient to counter the force from the main spring (18). When this position is reached, the spray dispenser (1) is primed and ready for actuation. Actuation is achieved by depressing a trigger (23) at the top of the spray dispenser (1).

In some embodiments, not illustrated, there may be a blocking element preventing rotation of the collar (6) significantly beyond the rotational position referred to in the paragraph immediately above. In other embodiments (not illustrated), there may a sensory indicator that said position has been reached.

Figure 5:
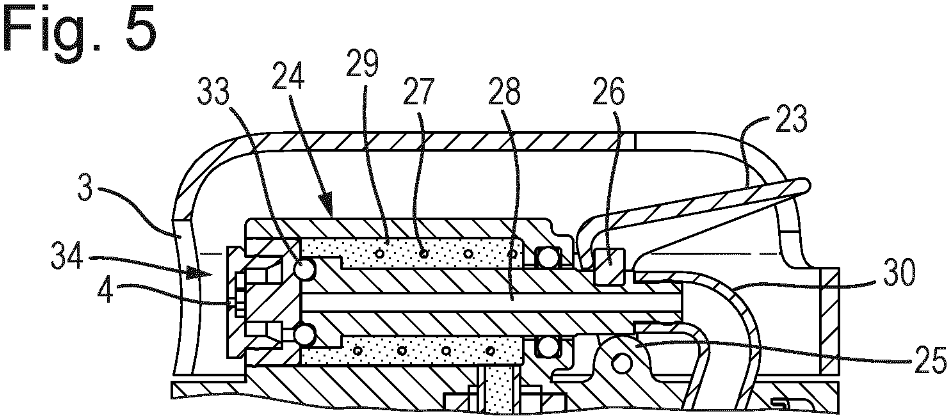
FIG. 5 is an enlarged cross-sectional view of the upper part of the spray dispenser (1) illustrated in FIGS. 1 to 4, with the trigger (23) closed.
Figure 6:
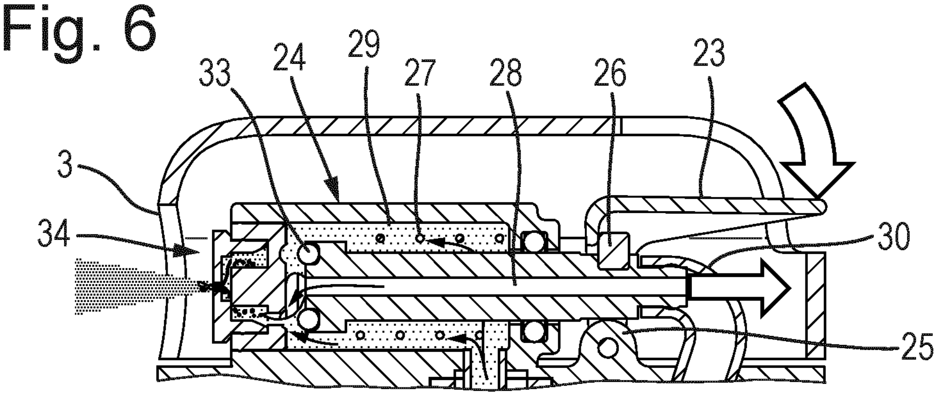
FIG. 6 is an enlarged cross-sectional view of the upper part of the spray dispenser (1) illustrated in FIGS. 1 to 4, with the trigger (23) opened.

The effect of depressing the trigger (23) is illustrated in FIGS. 5 and 6. The trigger (23) is designed to pull back a horizontal conduit (24) located within the spray through cap (2) diametrically in line with the spray orifice (4). The trigger (23) has a hinge point (25) located below the horizontal conduit (25) and acts upon a blocking element (26) located above the conduit (25) and rigidly affixed thereto. The trigger (23) is bent into a right angle shape so that downward pressure on the end of the trigger (23) causes an element of lateral pressure on the blocking element (26) thereby drawing back the conduit (24). As the conduit (24) is drawn back, a valve spring (27) (vide infra) becomes compressed. When the trigger is released, the compressed valve spring (27) forces the horizontal conduit (24) back to its original position.

The horizontal conduit (24) comprises a central air channel (28) and an annular liquid channel (29) surrounding it. The aforementioned valve spring (27) sits in the annual liquid channel (29).

In other embodiments, not illustrated, it is possible to have a central liquid channel and a surrounding annular air channel.

The central air channel (28) is linked to the bellows (10) by a flexible air conduit (30) and the annual liquid channel (29) is linked to the refill unit (7) and its contents by a central, axial liquid conduit (31) linking to a flexible dip-tube (32) which enters the liquid composition in the liquid chamber (8).

Drawing back the horizontal conduit (24) with the trigger (23) opens an O-ring seal (33) between it and a spray nozzle (34) located at the front of the dispenser and comprising the exit orifice (4). When the horizontal conduit (24) is not drawn back, the O-ring seal (33) is held firmly closed by the valve spring (27). When the O-ring seal (33) is opened, air from the central air channel (28) and liquid from the annular liquid channel (29) are allowed to enter the spray nozzle (34), as shown in FIG. 6.

Air from the air channel (28) is forced into the spray nozzle (34) from the bellows (10) via the flexible air conduit (30), pressurised by the main spring (18). As this happens, the bellows (10) get compressed and the internal chassis (16) rises upwards under pressure from the main spring (18).

Liquid from the annular liquid channel (29) is forced under pressure into the spray nozzle (34) from the liquid chamber (8) via the central liquid conduit (31) and the dip-tube (32). In this embodiment, the liquid composition in the liquid chamber (8) is pressurised by air from the bellows (10) via an air-to-refill conduit (35), air entering through an inlet hole (35H) in its side (see FIGS. 2, 3 and 4). The air-to-refill conduit (35) holds the central liquid conduit (31) within it and connects into a cylindrical protrusion (12P) from the top of the internal cylindrical receiver (12R) (vide supra) with an O-ring seal (35S). The cylindrical protrusion (12P) and associated internal cylindrical receiver (12R) may be rotated around the O-ring seal (35S) relative to the air-to-refill conduit (35) and associated central liquid conduit (31).

In other embodiments, the liquid in the liquid chamber (8) may be pressurised in other ways.

Figure 7:
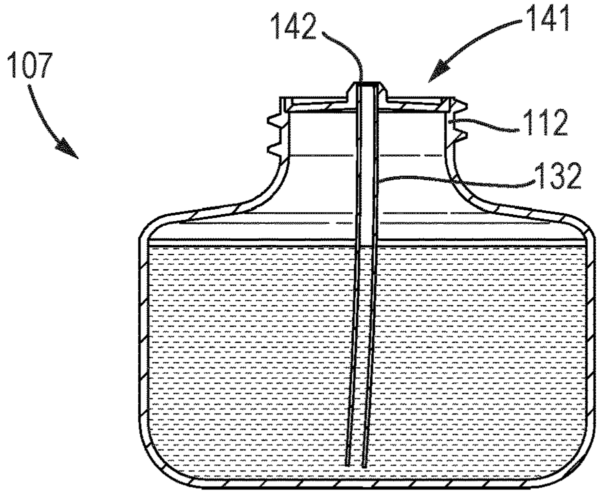
FIG. 7 is a cross-sectional view of a refill unit (107) having an integrated dip-tube (132).
Figure 8:
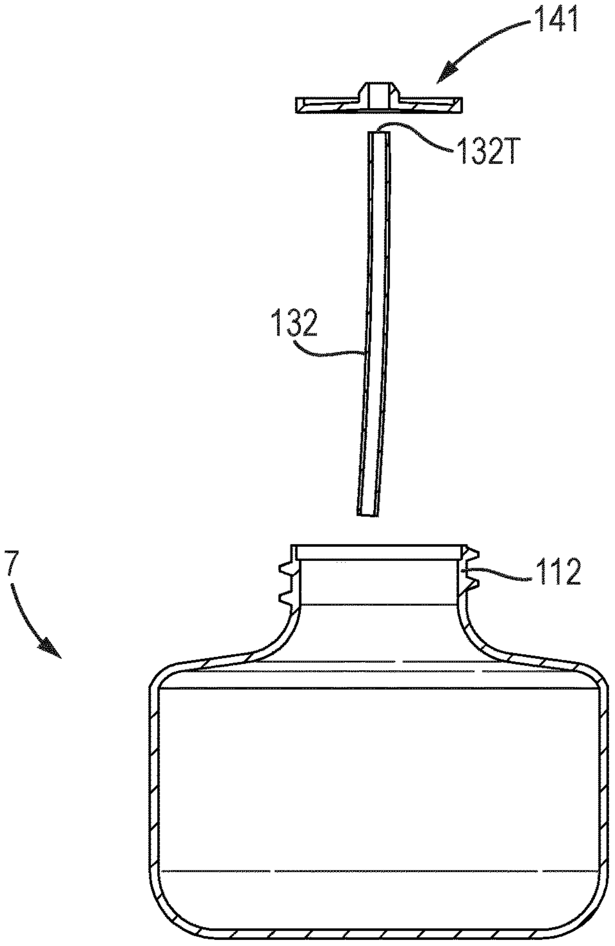
FIG. 8 is an exploded cross-sectional view of the refill unit (107) illustrated in FIG. 7.

The dip-tube (32, 132) may extend directly from the central liquid conduit (31) or it may be integrated into a refill unit (107) as illustrated in FIGS. 7 and 8. In such embodiments, the top of a dip-tube (132T) is held stationary in a neck (112) of the refill unit (107) by a sealing interface (141), which also helps to seal the top of a dip-tube (132T) to the bottom of the central liquid conduit (31) when the refill unit (107) is inserted. The top of the dip-tube (132) is typically covered by a seal (142), which needs to be removed or pierced prior to the refill unit (107) being inserted.

Figure 9:
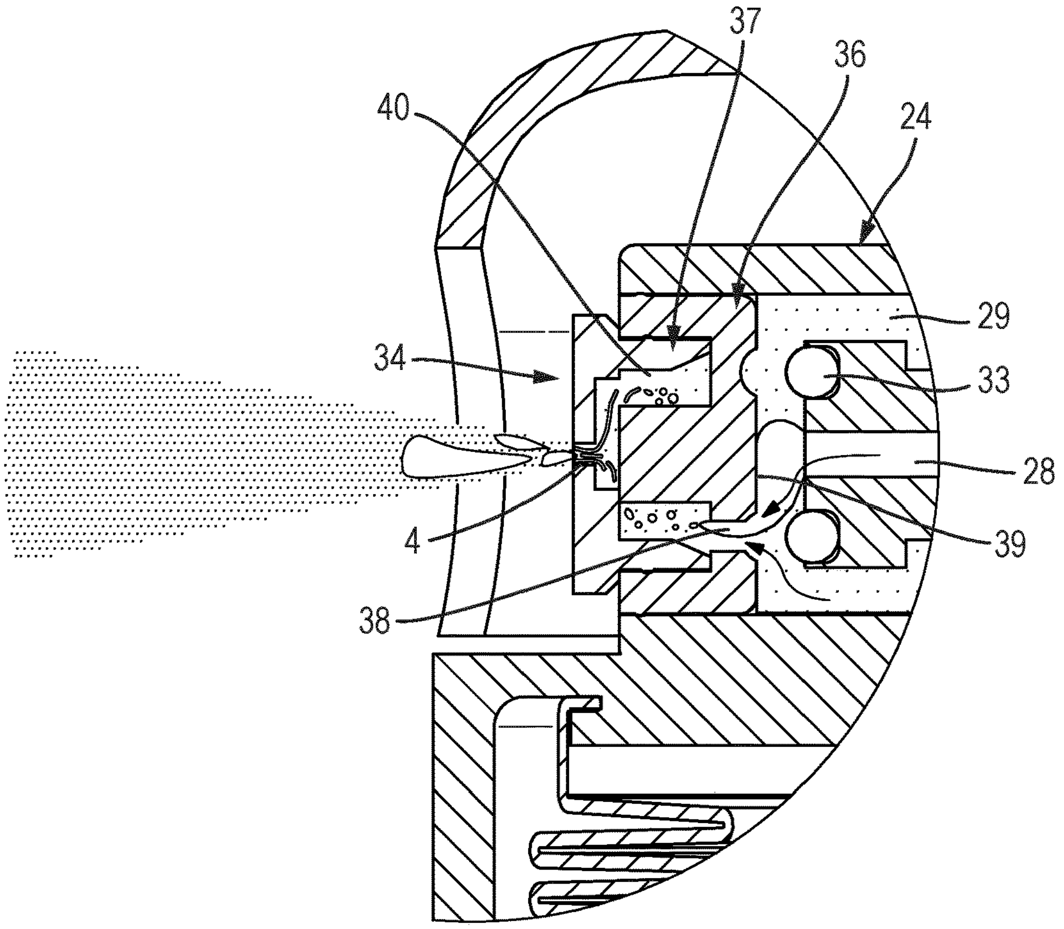
FIG. 9 is a detailed cross-sectional view of a spray nozzle (34) and associated components suitable for use with multiple embodiments of the invention, including the embodiment represented in FIGS. 1 to 6.
Figure 10:
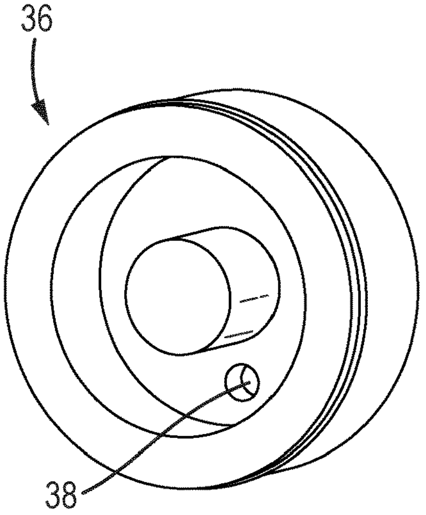
FIG. 10 is a view of an inlet chassis (36) which makes up part of a spray nozzle (34) suitable for use with multiple embodiments of the invention.
Figure 11:
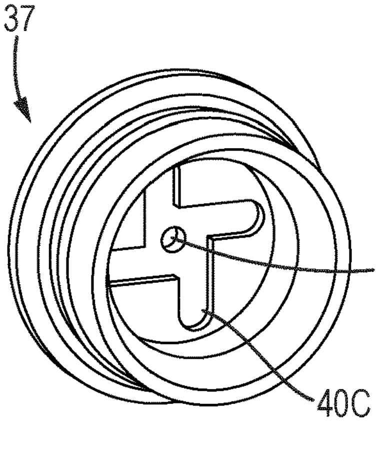
FIG. 11 is a view of a mechanical break up unit (37) which makes up a further part of a spray nozzle (34) suitable for use with multiple embodiments of the invention.

FIG. 9 gives a detailed view of the spray nozzle (34) and the terminal end of the horizontal conduit (24) when the O-ring seal (33) is open. The spray nozzle (34) is comprised of two components that fit tightly together. First, there is a valve chassis (36), which is further illustrated in FIG. 10. Secondly, there is a mechanical break up unit (37), which is further illustrated in FIG. 11.

The O-ring seal (33) seals against the internal face of the valve chassis (36) when the valve is closed. This blocks an inlet orifice (38) through an inner wall (39) of the valve chassis (36). When the O-ring seal (33) is released, air from the air channel (28) and liquid from liquid channel (29) are mixed adjacent to the inlet orifice (38) before entering a mixing chamber (40) or “turbulence chamber” (40) via the inlet orifice (38). The mixing chamber (40) exists between the valve chassis (36) and the mechanical break up unit (37) and has an annular form. The mixing chamber (40) creates chaotic flow, typically reducing air bubble size within the liquid which enhance atomisation when the air-liquid mixture leaves the mixing chamber (40) via the exit orifice (4) which is centrally located in the outer edge of the mechanical break up unit (37). The chaotic flow within the mixing chamber (40) may be further enhanced by recessed channels (40C) cut into internal face of the mechanical break up unit (37). In the present embodiment, there are four of these recessed channels (40C) extending tangentially away from the exit orifice (4).

Figure 12:
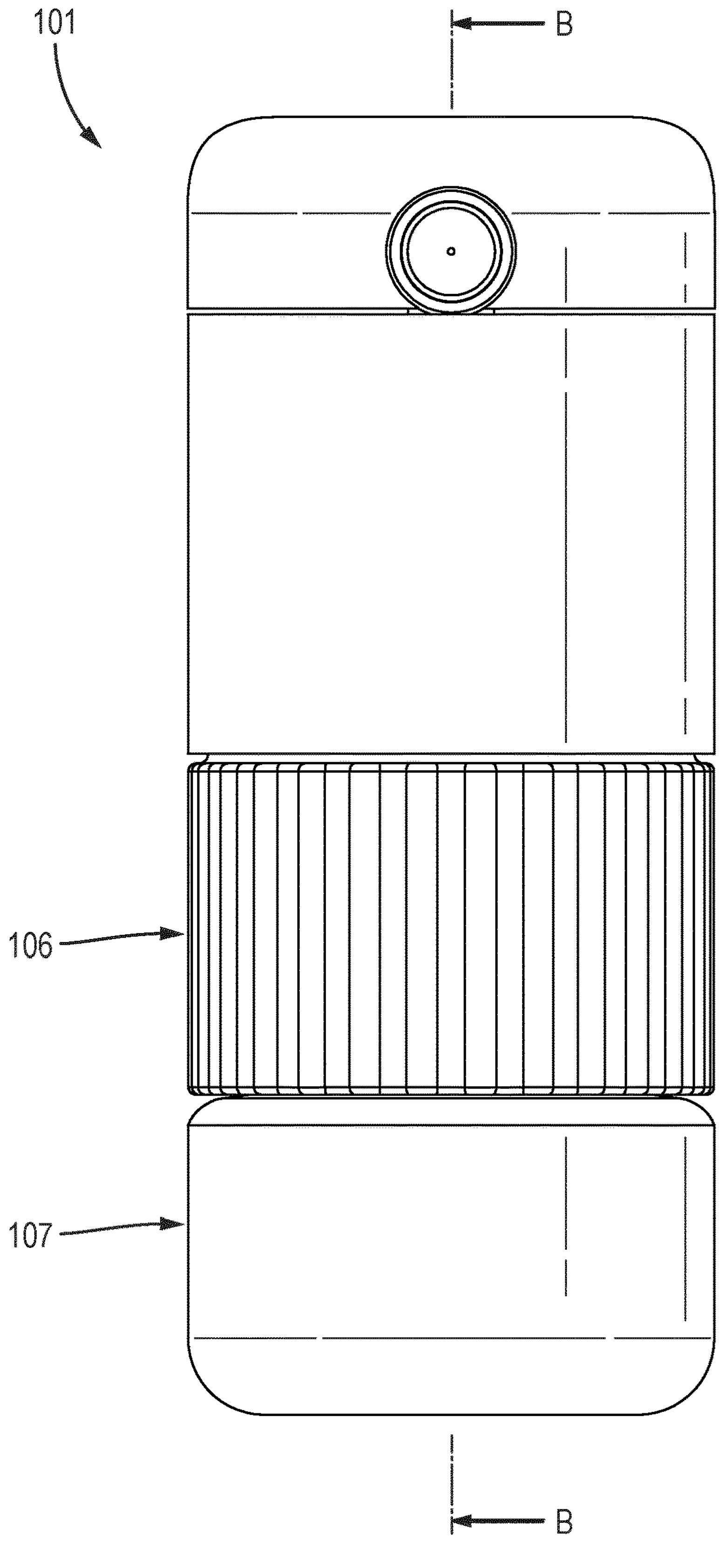
FIG. 12 is a front view of a second embodiment of a spray dispenser (101) according to the invention, in which the collar (106) may be rotated independent of the refill unit (107).
Figure 13:
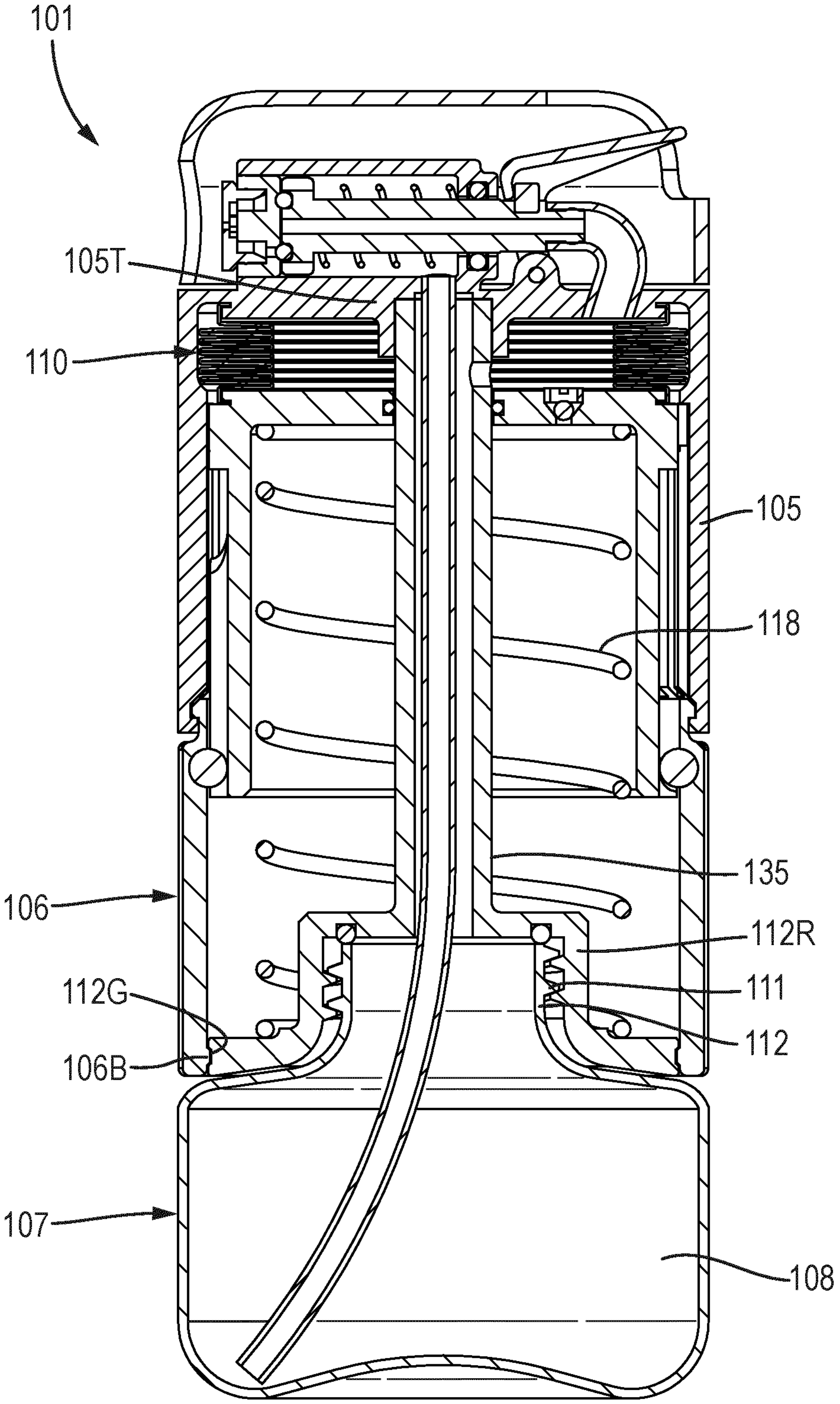
FIG. 13 is a cross-section through a spray dispenser (101) as illustrated in FIG. 12.
Figure 14:
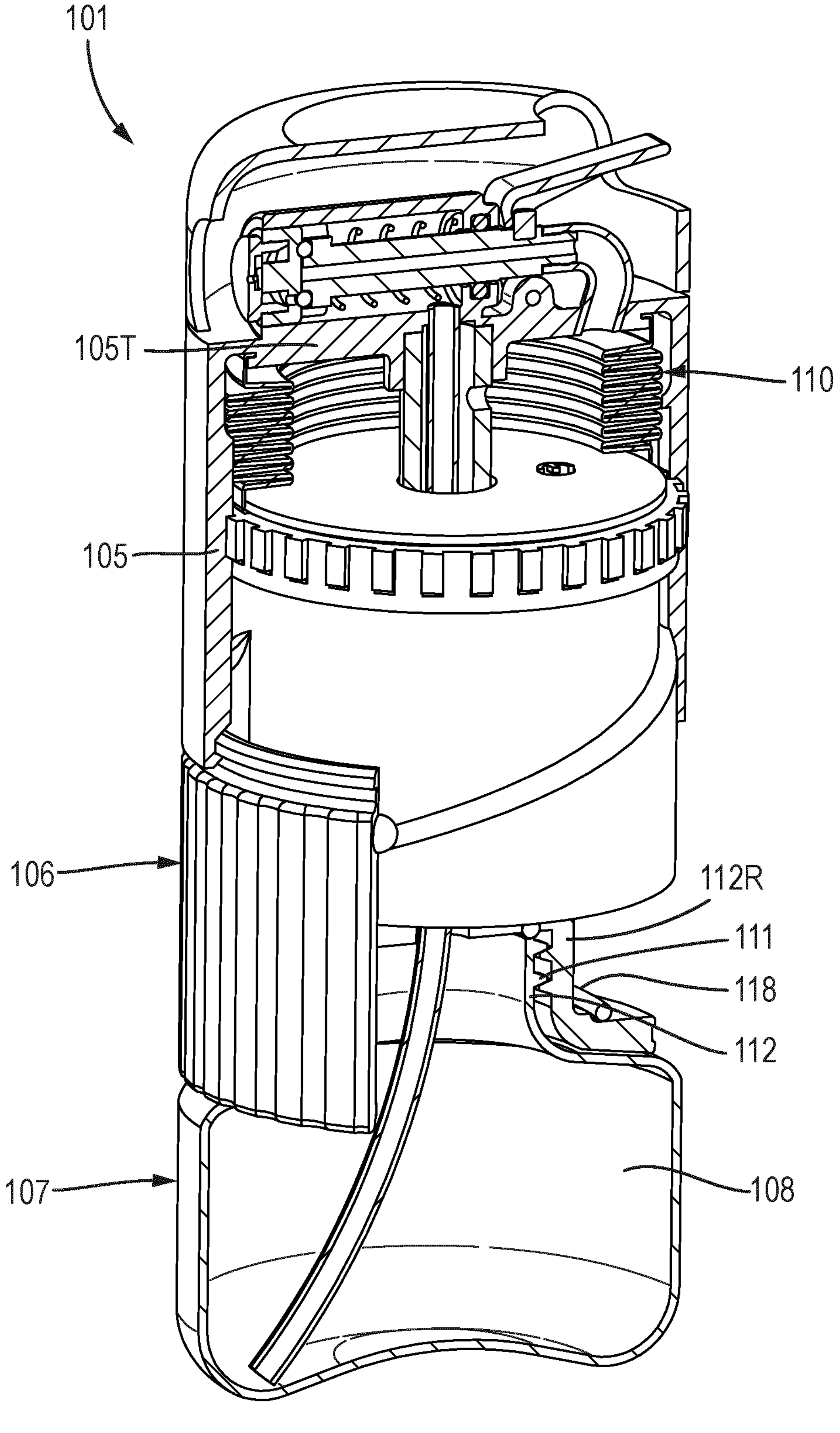
FIG. 14 is an isometric view of the spray dispenser (101) as illustrated in FIGS. 13, but with the bellow (110) slightly expanded.

In a further embodiment of the present invention, a rotatable collar (106) may be rotated independent of an associated refill unit (107). Such an embodiment is illustrated in FIGS. 12 to 14. FIG. 12 shows the positioning of the major components, a rotatable collar (106) being located around a lower middle section of the dispenser (101) and the refill unit (107) being located below this. The collar (106) is designed to rotate around the long axis (B) of the cylindrical dispenser (101).

The embodiment illustrated in FIGS. 12 to 14 shares many of the features of the first embodiment illustrated in FIGS. 1 to 11, so those features will not be further described with reference to this embodiment in any detail. These features function in an analogous manner to those disclosed in the first embodiment described above.

FIGS. 13 and 14 illustrate that the second embodiment comprises a bellows (110), a main spring (118) and a refill unit (107). The refill unit (107) has a liquid chamber (108) and a neck (112), the neck (112) being reversibly attached to an internal cylindrical receiver (112R) by a screw thread (111). The internal cylindrical receiver (112R) is rotationally immobile on account of being moulded to an axial air-to-refill conduit (135) which is in turn held rotationally immobile by a top section (105T) of an outer shell (105).

There is also a rotatable collar (106) responsible for pulling the internal chassis (116) downwards and thereby expanding the bellows (110) and compressing the main spring (118), in a manner analogous to that occurring in the first embodiment described above.

In this second embodiment, the internal cylindrical receiver (112R) holding the neck (112) of the refill unit (107) is attached to the collar (106) by a bead (106B) protruding from the inner surface of the collar (106) and a recess (112R) in the outer circumference of the internal cylindrical receiver (112) which accommodates the bead (106B). The bead (106B) and recessed groove (112G) allow the collar (106) to rotate relative to the internal cylindrical receiver (112R), in a manner analogous to the snap-fit connection elements (19, 20) between the lower circumference of the cylindrical outer shell (5) and the upper circumference of the rotatable collar (6) in the first embodiment described above. The bead (106B) and recessed groove (112G) of this second embodiment may also be "snap-fit" in nature.

Figure 15:
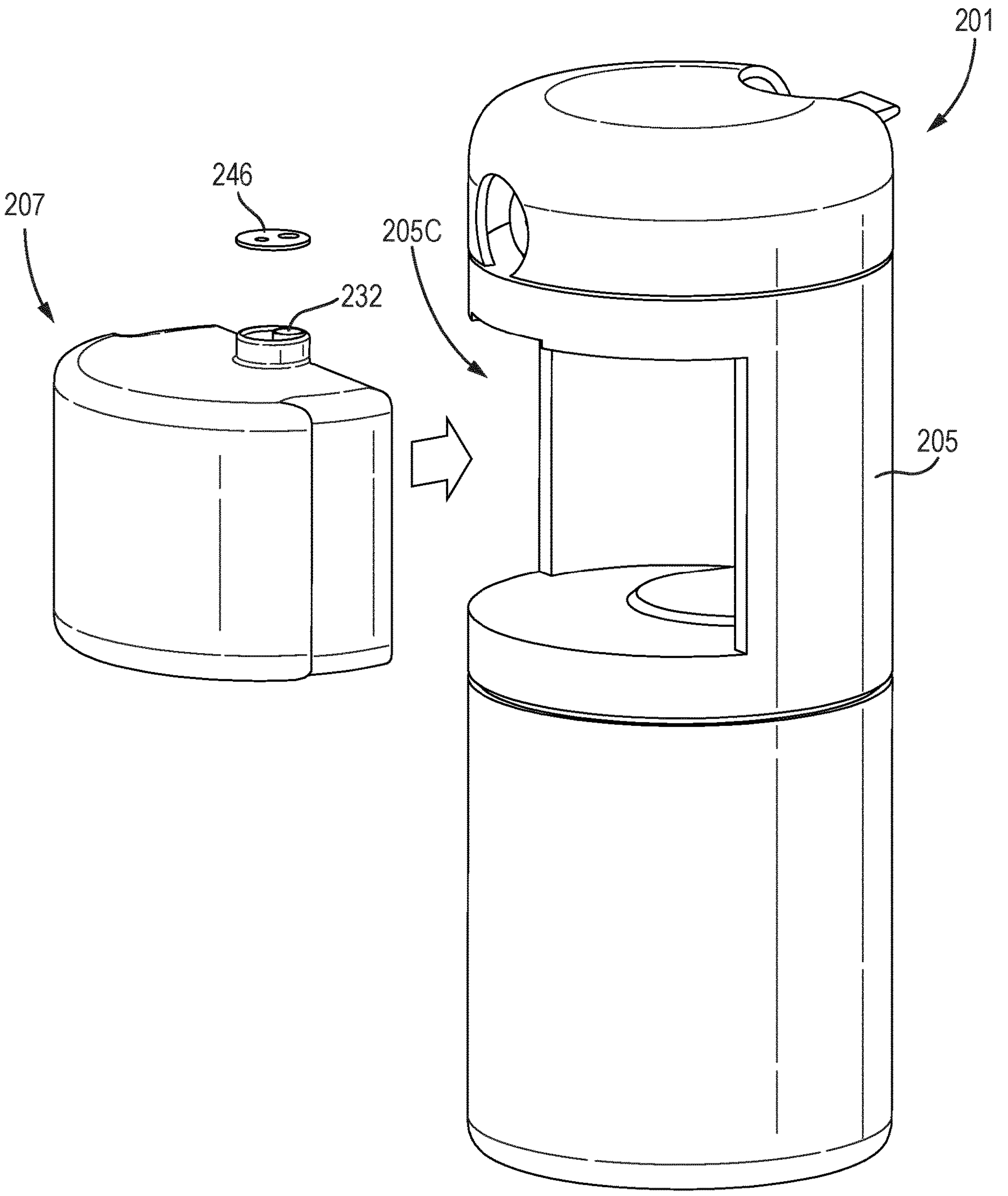
FIG. 15 is an exploded view of a further embodiment of a spray dispenser (201) according to the invention, in which the refill unit (207) may be fitted centrally into the dispenser (201), but is shown separated therefrom in this figure.
Figure 16:
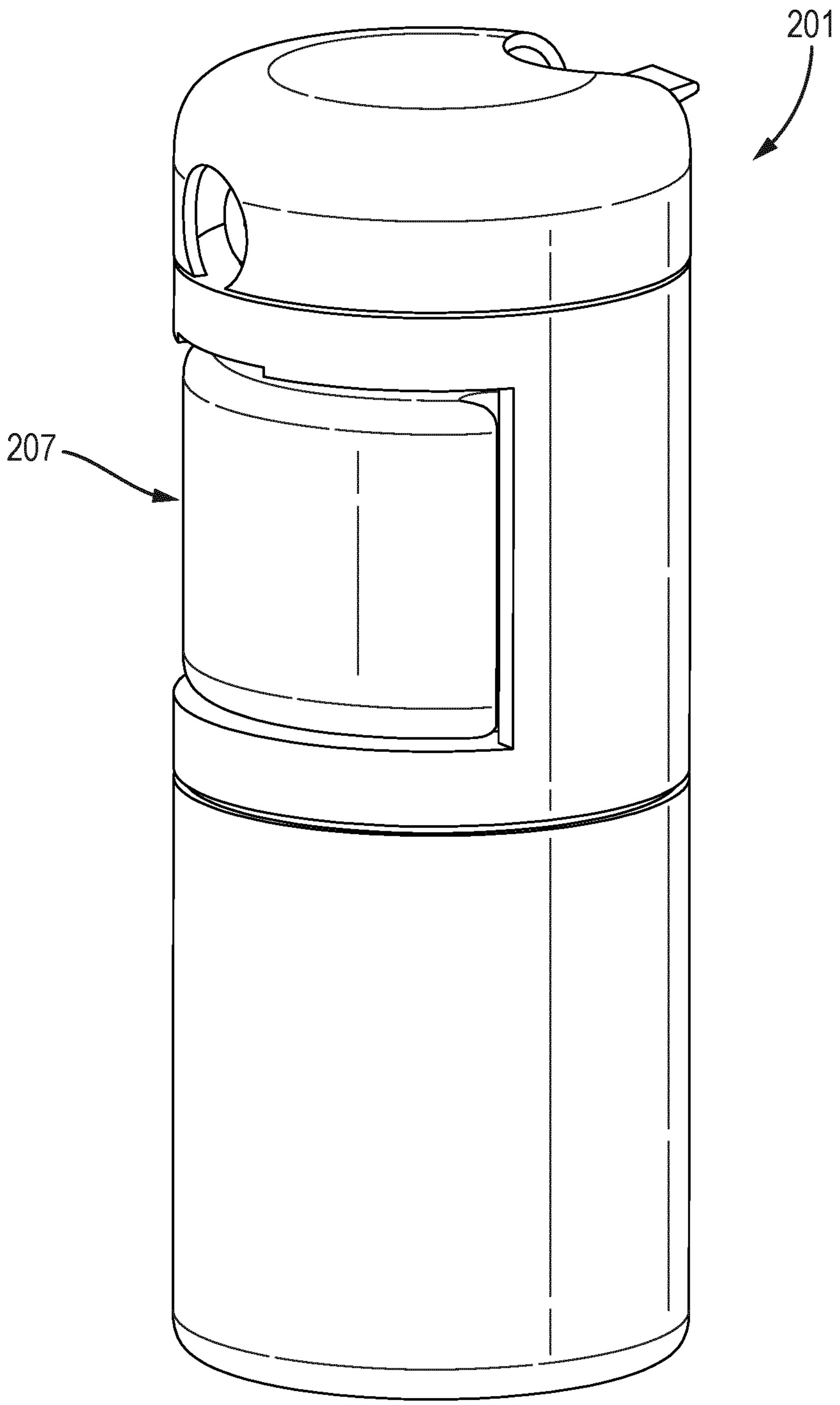
FIG. 16 is a view of the embodiment shown in FIG. 15, but with the refill unit (207) inserted into the dispenser (201).

In further embodiments of the present invention, a refill unit (207) may be centrally loaded into the spray dispenser (201). Such embodiments are illustrated in FIGS. 15 to 19. FIG. 15 is an exploded view showing the refill unit (207) separated from the spray dispenser (201). Also shown is a seal (246) for retaining the contents of the refill unit (207). This needs to be removed before the refill unit (207) is inserted sideways into a cutaway section (205C) of the dispenser (201). FIG. 16 shows the spray dispenser (201) with the refill unit (207) inserted.

In preferred embodiments having a centrally loaded refill unit (207), the refill unit (207) has an integrated or moulded-in dip-tube (232), as shown in FIG. 15. Before the refill unit (207) is inserted, the top of the moulded-in dip-tube (232) is covered by the seal (246) mentioned above. When the seal (246) has been removed or pierced and the refill unit (207) is inserted, the top of the dip-tube (232) links to an axial liquid conduit (231) above, which in turn links to an annular liquid channel (229) in a horizontal conduit (224) in a spray-through cap (202). These elements operate in an analogous manner to the equivalent features (32, 31, 29 and 24) in the first embodiment described herein above. At the lower end of the dip-tube (232), there is an inlet hole (247) allowing ingress of a liquid composition from a liquid chamber (208) into the dip-tube (232).

Figure 17:
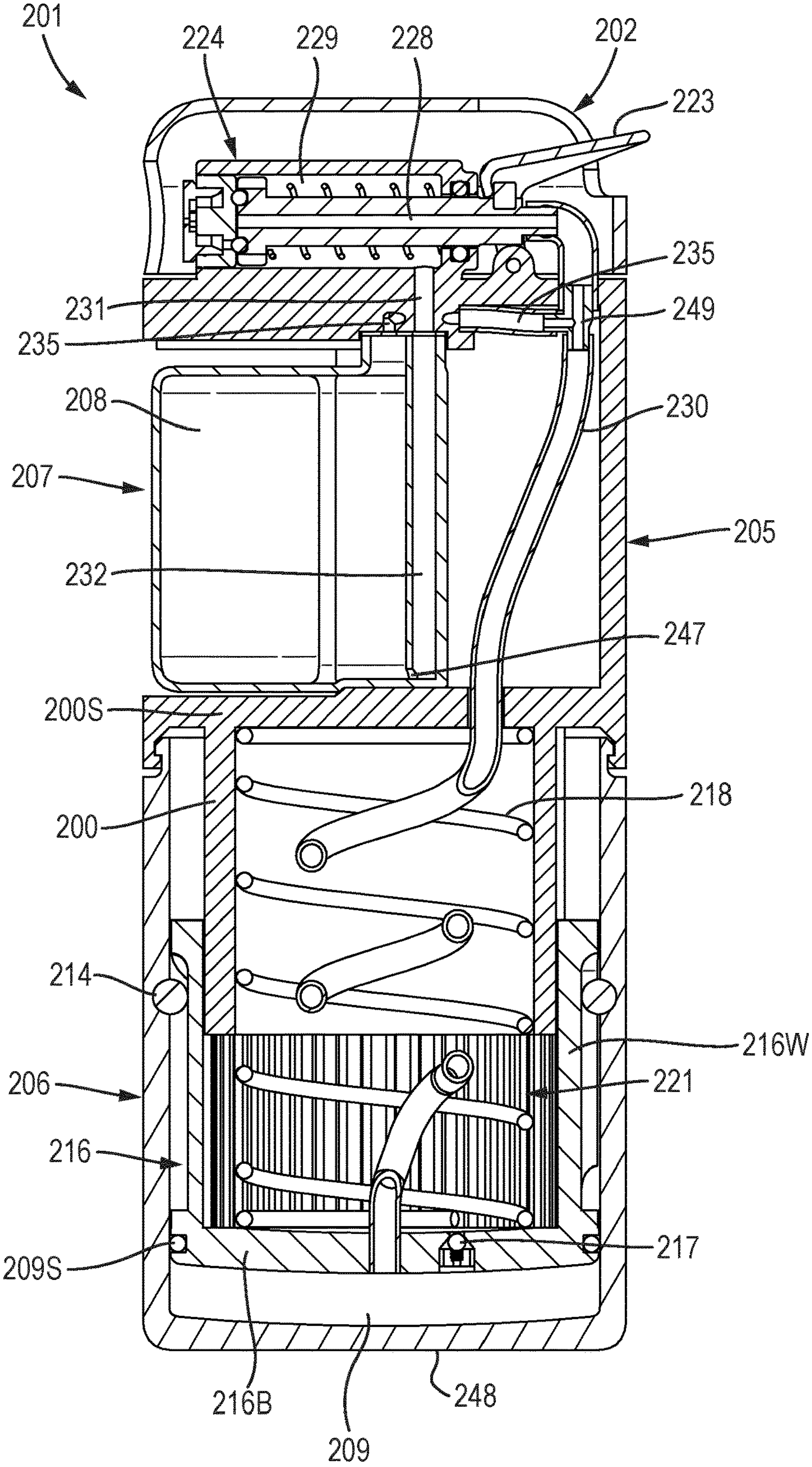
FIG. 17 is a cross-section through a spray dispenser (201) as illustrated in FIG. 16 with a main spring (218) expanded.
Figure 18:
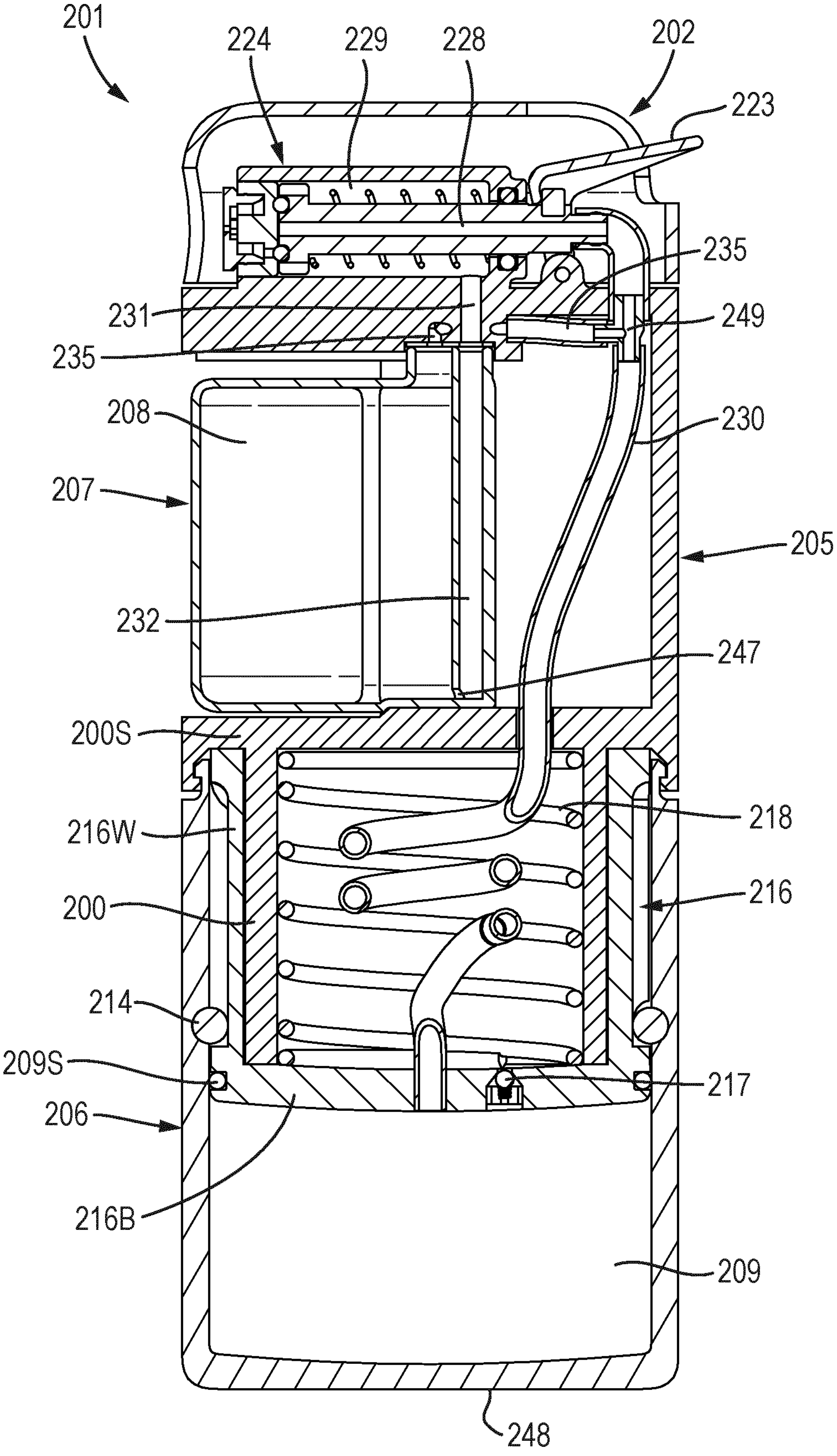
FIG. 18 is cross-section through a spray dispenser (201) as illustrated in FIG. 17, but with the main spring (218) fully compressed.
Figure 19:
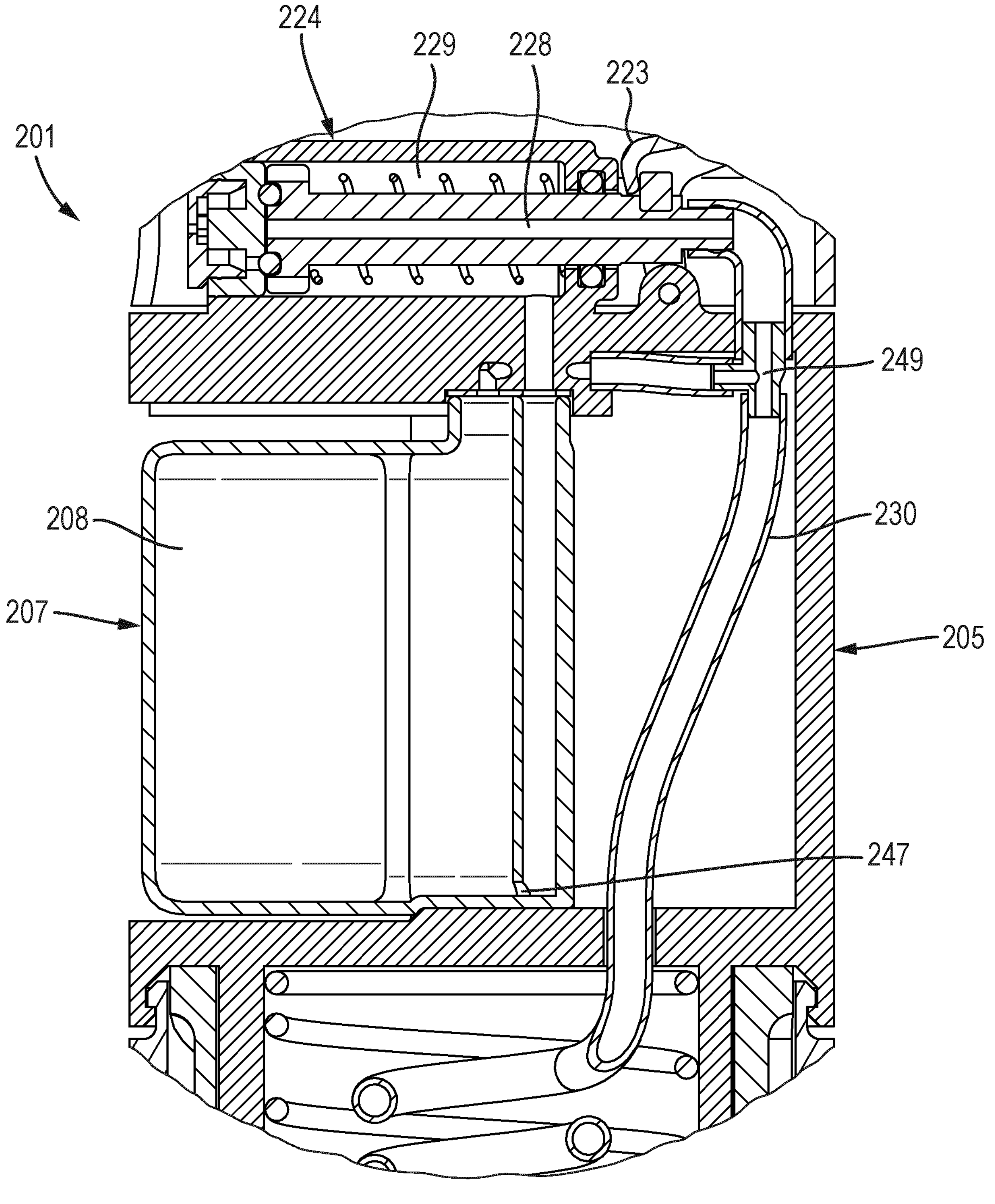
FIG. 19 is an enlarged cross-section through a central part of the spray dispenser (201) illustrated in FIG. 18.

FIGS. 17 to 19 illustrate further features of a spray dispenser (201) having a centrally loaded refill unit (207). Surrounding and holding the refill unit (207) there is a cylindrical outer shell (205), having a cutaway section (205C) (vide supra) for the refill unit (207). The outer shell (205) houses not only the refill unit (207) but a section of a flexible air conduit (230) that runs from an air chamber (209) at the bottom of the dispenser (201) to features located in and adjacent to the spray through cap (202) located at the top of the dispenser (201) (vide infra).

Extending downwards from the outer shell (205) there is a rotatable lower section (206) of the dispenser (201) which has a flat base (248) at its bottom. Contained within the rotatable lower section (206) is an axially mobile internal chassis (216), which has a base (216B) and an upstanding cylindrical wall (216W) and which performs the same function as the internal chassis (16) of the first embodiment of the invention as described hereinabove. Surrounding the internal chassis (216) there is a rotatable collar (206) which shares key features with the rotatable collar (6) of the first embodiment of the invention described hereinabove and performs the same function. Within the internal chassis (216) there is an internal cylindrical support wall (200) which protrudes downwards from a horizontal shelf (200S) which supports the refill cartridge (207), when inserted. Vertical splines (not shown) protrude radially inward from the outer surface of the internal support wall (200) and interact with vertical spline followers (221) radially recessed into the inner surface of cylindrical wall (216W) of the internal chassis (216), preventing rotation therebetween.

Within the internal support wall (200) there is a main spring (218) which powers the dispenser (201).

At the bottom of the rotatable lower section (206) of the dispenser (201), between the internal chassis (216) and the base (248) of the dispenser (201), there is an air chamber (209) which is adjustable in volume. The air chamber (209) is kept sealed by a piston seal (209S) between the bottom of the internal chassis (216) and the rotatable lower section (206). The piston seal (209S) allows for rotation of the rotatable lower section (206) about the inner chassis (216).

Air enters the air chamber (209) via check valve (217) when the air chamber (209) is expanding and leaves the air chamber via the flexible air conduit (230) when the air chamber (209) is being compressed.

The internal chassis (216) is forced upwards by the action of the rotatable collar (206) and cam ramps (215) and ball cam followers (214) in an analogous manner to that described in the first embodiment hereinabove, but with the axial direction reversed. Just as in the first embodiment, when the cam followers (214) have been rotated beyond the ends of their respective cam ramps (not shown), the dispenser (201) is primed and ready for actuation.

The central refill dispenser (201) is activated and operates in the same manner as the dispenser (1) of the first embodiment, apart from the details mentioned herein. A main difference is that the cam ramps of this central refill dispenser (201) are inverted compared with those of the first embodiment, resulting in the internal chassis (216) being pulled upwards as the collar (206) is rotated. Just as in the first embodiment, this compresses the main spring (218) and expands the air chamber (209), thereby preparing the dispenser (201) for actuation.

Actuation is achieved by depressing a trigger (223) at the top of the spray dispenser (201). The operation of the trigger (223) and mechanism of spray generation is essentially the same as in the first embodiment described hereinabove. A minor difference lies in the air flow from the air chamber (209) when the trigger (206) is depressed. Air flows up the flexible air conduit (230) from the air chamber (209) and passes towards a central air channel (228) in a horizontal conduit (224) as in the first embodiment. In so doing, it passes a T-junction (249), where some of the air flow from the air chamber (209) is diverted towards liquid in the refill unit (207) via an air-to-refill conduit (235). The air pressure from the air-to-refill conduit (235) forces liquid composition in a liquid chamber (208) up the dip-tube (232) and into an annular liquid channel (229), as in the first embodiment described hereinabove. Generation of an aerosol spray proceeds in the same manner as in the first embodiment.

In other embodiments of the present invention, liquid in a liquid chamber (308) is directly pressurized by a manually activated element (350). Schematic representations of such embodiments, merely showing the interrelationship of the components, are shown in FIGS. 20 to 25.

Figure 20:
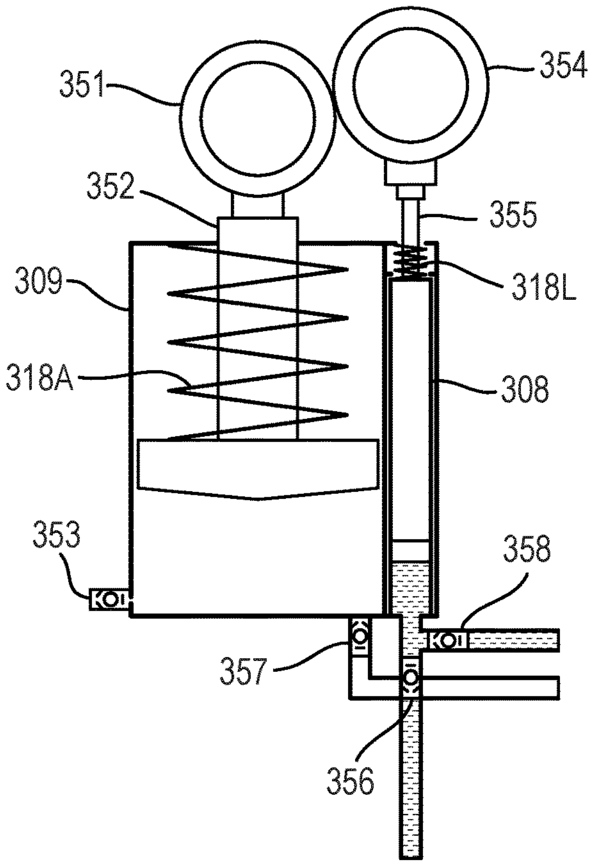
FIG. 20 is a schematic representation of selected features of a further embodiment in which the liquid is forced from a liquid chamber (308) under direct mechanical pressure.

FIG. 20 shows an arrangement whereby air is drawn into an air chamber (309) by a first manual activation element (351) attached to a piston (352), the air passing through an air inlet check valve (353) and a compression spring (318A) around the piston (352) becoming compressed. A second independent actuation element (354) attached to a second piston (355) draws liquid into a liquid chamber (308) through a liquid check valve (356) and a second compression spring (318L) around the neck of the piston (355) becomes compressed. Following this “priming” step, pressure generated by springs (318A, 318L) may be used to pressurise the air and liquid through outlet valves (357, 358) and towards a spray nozzle (not shown). In FIG. 20, the manual activation elements (351, 354) are represented by ring pulls; however, the air chamber manual activation element (351) is representative of an element that is rotated with a unidirectional twist to generate pressure, indirectly in this embodiment, on the air in the air chamber (309). Also, the liquid chamber manual activation element (354) is representative of any manually activated element that could be used to draw back the piston (318), including ones which are rotated with a unidirectional twist to generate pressure on the liquid in the liquid chamber (308). The above statements concerning the manual activation elements (351, 354) are also true for analogous features in the following embodiment descriptions.

Figure 21:
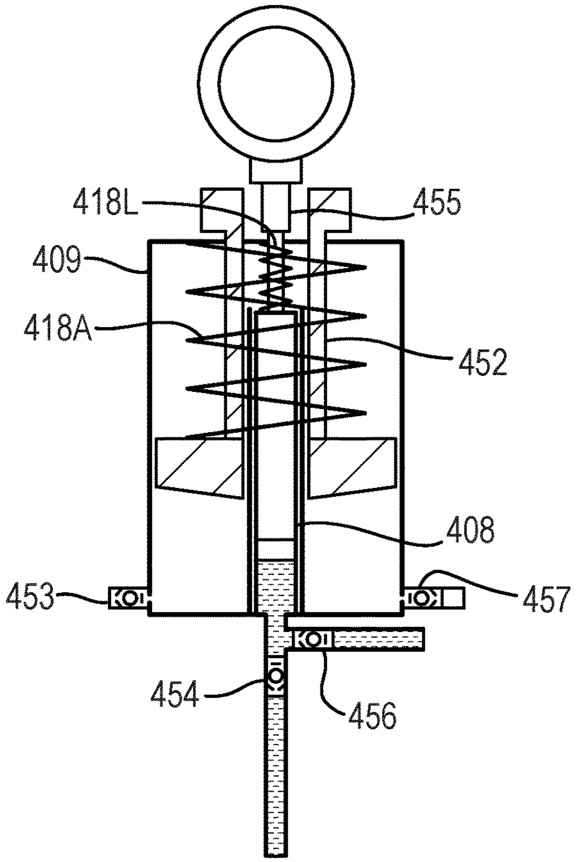
FIG. 21 is a schematic representation of selected features of an embodiment similar to the one illustrated in FIG. 20, but which has concentric pistons (442, 445) pressurising liquid and air chambers (408 and 409 respectively).

The embodiment represented in FIG. 21 is similar to that shown in FIG. 20, except that the pistons (452, 455) are arranged concentrically, with the liquid piston (455) on the inside. As with the embodiment of FIG. 20, the liquid chamber (408) has an inlet valve (454) and an outlet valve (456) and the air chamber (409) has an inlet valve (453) and an outlet valve (457). When the dispenser (1) is actuated, a first spring (418L) forces the liquid from the liquid chamber (408) and a second (larger) spring (418A) forces air from the air chamber (409). To refill the liquid chamber (408) and the air chamber (409), both the liquid piston (455) and an air piston (452) need to be withdrawn.

Figure 22:
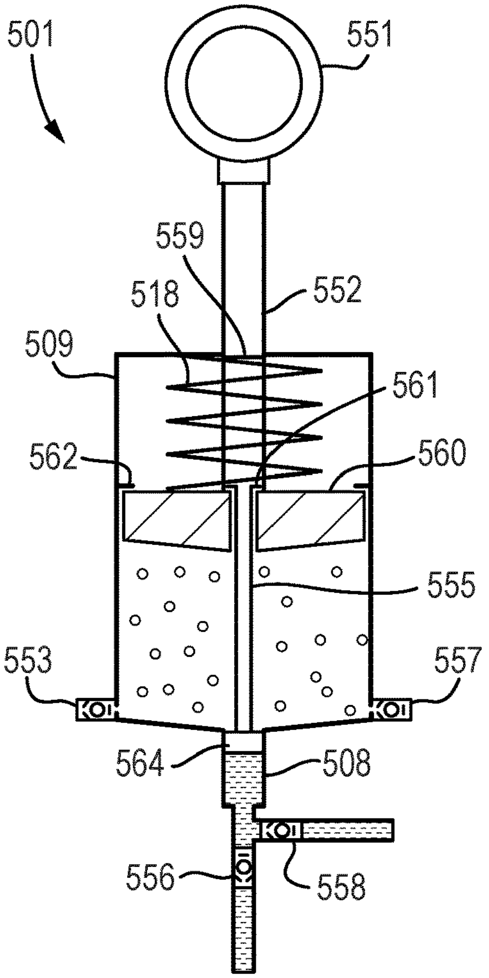
FIGS. 22 to 25 are schematic representations of various stages of the dispensing for an embodiment again utilising direct pressurisation of liquid in a liquid chamber (509), this embodiment having a single manual activation element (551).
Figure 23:
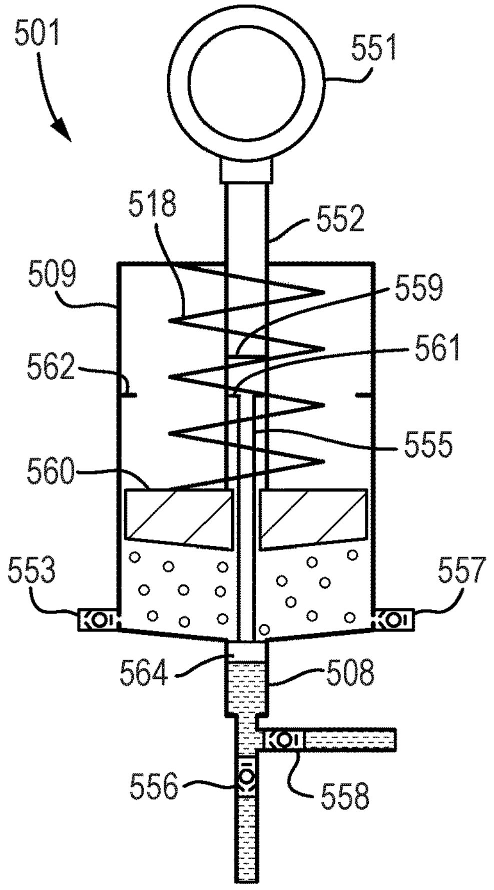
Figure 24:
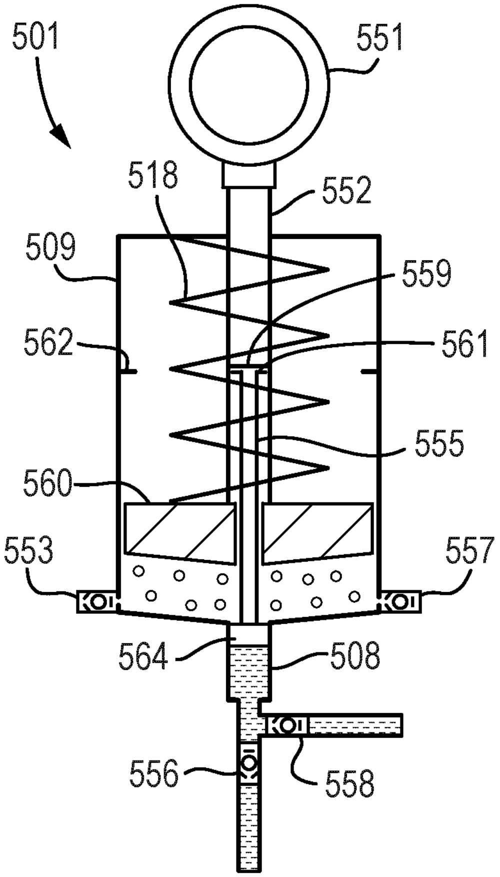
Figure 25:
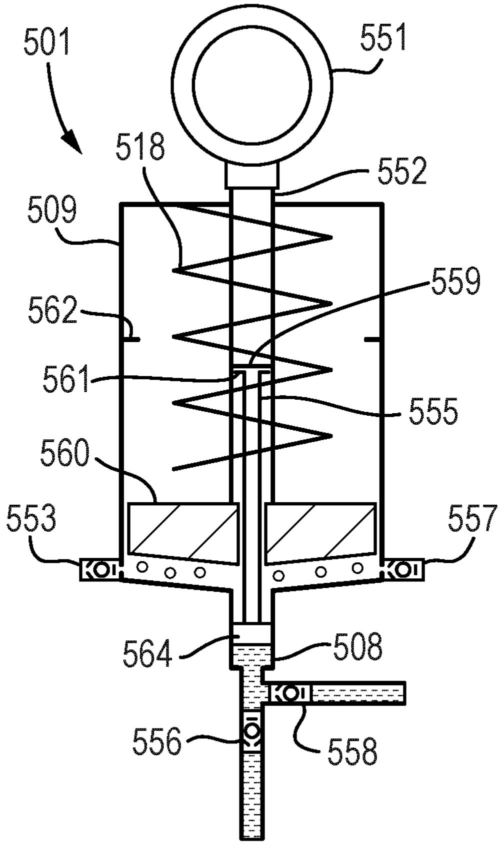

The embodiment represented in FIGS. 22 to 25 also comprises concentric pistons (552, 555) with the liquid piston (555) on the inside and valving (553, 556, 557, 558) as for the embodiments represented in FIGS. 20 and 21. This embodiment has the advantage that a single manual activation element (551) is required. FIG. 22 represents the dispenser (501) in a primed state, ready for actuation. Depression of a major (air) piston (552) by expansion of a compression spring (518) at first merely causes compression of the air in an air chamber (509). This position is shown in FIG. 23. When sufficient air pressure is generated in the air chamber (509), an air outlet valve (557) is opened and the released air is conveyed to a spray nozzle (not shown). This position is shown in FIG. 24. When the major piston (552) is depressed just beyond the position shown in FIG. 24, a cross member (559) within the major piston (552) engages with a top section of the inner liquid piston (555) and causes it to be depressed, thereby forcing liquid out of a liquid chamber (508) through a liquid outlet valve (558). This position is shown in FIG. 24. With air also exiting the air chamber (509) at the same time, air and liquid may be delivered to the spray nozzle at the same time to generate a spray.

To refill the spray dispenser (501) represented by FIGS. 22 to 25, a single manual activation element (551) is energised by being pulled upwards. This immediately pulls the air piston (552) upwards and starts to draw air into the air chamber (509) via the air inlet valve (553). When the air piston (552) has risen to near the top of the liquid piston (555), the top of a piston head section (560) of the air piston (552) interacts with a ledge (561) projecting laterally outwards from the top of the liquid piston (555). This causes the liquid piston (555) also to be pulled upwards and starts to draw liquid into the liquid chamber (508) via the liquid inlet valve (556). Elevation of the air piston head section (560) is stopped when its top hits stoppers (562) projecting inwards from the inner wall (563) of the dispenser (510). The stoppers (562) are positioned to stop elevation of the air piston (552) when a piston head (564) of the liquid piston (555) has reached the top of the liquid chamber (508) and the latter is full of liquid.

The invention claimed is:

1. A hand held spray dispenser comprising:

a liquid chamber;

an air chamber; and a mixing chamber;

wherein flow of a liquid in the liquid chamber and flow of air in the air chamber towards the mixing chamber is prevented by one or more valves of the spray dispenser;

wherein when the one or more valves are released, the liquid is forced under pressure from the liquid chamber to the mixing chamber via a liquid conduit and the air is forced under pressure from the air chamber to the mixing chamber via an air conduit to form an air-liquid mixture;

wherein the air-liquid mixture in the mixing chamber is forced through an exit orifice of the spray dispenser as a spray, wherein the spray dispenser has a single collar sitting around the spray dispenser in a plane orthogonal to a long axis of the spray dispenser that is configured to be rotated about the long axis of the spray dispenser with a unidirectional twist to energise one or more springs in the spray dispenser;

wherein energy from the one or more springs is released to generate sufficient air pressure and air flow and sufficient liquid flow for a spray to be formed from the air-liquid mixture as it leaves the exit orifice;

wherein rotation of the collar forces a cam follower of the spray dispenser to progress about a helical cam ramp in the spray dispenser causing axial movement of an internal chassis in the spray dispenser;

wherein axial movement of the internal chassis is configured to draw air into the air chamber and simultaneously energize a spring of the one of more springs to pressurise the air in the air chamber and the liquid in the liquid chamber;

wherein the air from the air chamber is not used to pressurise the liquid; and wherein the air chamber comprises an inlet valve, wherein the inlet valve is configured to allow air to enter the air chamber whilst the air chamber is expanded.

2. The spray dispenser according to claim 1, wherein the air is pressurised at 0.3 bar to 3 bar prior to being forced from the air chamber.

3. The spray dispenser according to claim 1, wherein the spray dispenser is cylindrical in form.

4. The spray dispenser according to claim 1, wherein the liquid chamber is part of a refill unit, wherein the refill unit has a liquid chamber and a neck, the neck being reversibly attached to an internal cylindrical receiver by a screw thread.

5. The spray dispenser according to claim 1, wherein the collar does not need to be rotated back to its original position and where the spray dispenser is configured to reset itself ready for further activation during actuation.

6. The spray dispenser according to claim 1, wherein the air from the air chamber is introduced into the liquid from the liquid chamber adjacent to an inlet orifice of the mixing chamber.

7. The spray dispenser according to claim 6, wherein the inlet orifice and an outlet orifice of the mixing chamber are radially offset.

8. A method of topical application of a cosmetic composition comprising using the spray dispenser according to claim 1.

* * * * *